US011562220B2

(12) United States Patent
Park et al.

(10) Patent No.: US 11,562,220 B2
(45) Date of Patent: Jan. 24, 2023

(54) NEURAL PROCESSING UNIT CAPABLE OF REUSING DATA AND METHOD THEREOF

(71) Applicant: DEEPX CO., LTD., Seongnam-si (KR)

(72) Inventors: JungBoo Park, Seoul (KR); Hansuk Yoo, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 17/720,316

(22) Filed: Apr. 14, 2022

(65) Prior Publication Data
US 2022/0335282 A1 Oct. 20, 2022

(30) Foreign Application Priority Data

Apr. 14, 2021 (KR) .................. 10-2021-0048753
Feb. 11, 2022 (KR) .................. 10-2022-0018340

(51) Int. Cl.
*G06N 3/06* (2006.01)
*G06N 3/063* (2006.01)
(52) U.S. Cl.
CPC .................. *G06N 3/063* (2013.01)
(58) Field of Classification Search
CPC ............ G06N 3/06; G06N 3/063
See application file for complete search history.

(56) References Cited

U.S. PATENT DOCUMENTS 10,970,630 B1 * 4/2021 Aimone ............ G06N 3/04
11,113,601 B1 * 9/2021 Xiao ............ G06N 3/0454
11,275,997 B1 * 3/2022 Vantrease ............ G06N 3/0454
2018/0150721 A1 * 5/2018 Mostafa .................. G06N 3/063
2019/0122107 A1 * 4/2019 Young ..................... G06N 5/04
2022/0012856 A1 * 1/2022 Chen ..................... G06N 3/0454

FOREIGN PATENT DOCUMENTS

JP          2018-092559 A    6/2018
KR          10-1881676 B1    7/2018
KR       10-2019-0043419 A    4/2019
(Continued)

OTHER PUBLICATIONS

Mirzaeian, Ali, Houman Homayoun, and Avesta Sasan. "Tcd-npe: A re-configurable and efficient neural processing engine, powered by novel temporal-carry-deferring macs." 2019 International Conference on ReConFigurable Computing and FPGAs (ReConFig). IEEE, 2019. (Year: 2019).*

(Continued)

*Primary Examiner* — Hal Schnee
(74) *Attorney, Agent, or Firm* — Invenstone Patent, LLC

(57) ABSTRACT

A neural processing unit includes a mode selector configured to select a first mode or a second mode; and processing element (PE) array operating in one of the first mode and the second mode and including a plurality of processing elements arranged in PE rows and PE columns, the PE array configured to receive an input of first input data and an input of second input data, respectively. In the second mode, the first input data is inputted in a PE column direction of the PE array and is transmitted along the PE column direction while being delayed by a specific number of clock cycles, and the second input data is broadcast to the plurality of processing elements of the PE array to which the first input data is delayed by the specific number of clock cycles.

18 Claims, 20 Drawing Sheets

(56) References Cited

FOREIGN PATENT DOCUMENTS

| KR | 10-2019-0075989 A | 7/2019 |
| KR | 10-2020-0057814 A | 5/2020 |
| KR | 10-2020-0075185 A | 6/2020 |

OTHER PUBLICATIONS

Kang, Donghyun, et al. "A novel convolutional neural network accelerator that enables fully-pipelined execution of layers." 2019 IEEE 37th International Conference on Computer Design (ICCD). IEEE, 2019. (Year: 2019).*

Morcel, Raghid, et al. "Feathernet: An accelerated convolutional neural network design for resource-constrained fpgas." ACM Transactions on Reconfigurable Technology and Systems (TRETS) 12.2 (2019): 1-27. (Year: 2019).*

* cited by examiner

NEURAL PROCESSING UNIT CAPABLE OF REUSING DATA AND METHOD THEREOF

CROSS-REFERENCE TO RELATED APPLICATIONS

This application claims the priority of Korean Patent Application No. 10-2021-0048753 filed on Apr. 14, 2021 and Korean Patent Application No. 10-2022-0018340 filed on Feb. 11, 2022, in the Korean Intellectual Property Office, the disclosure of which is incorporated herein by reference.

BACKGROUND OF THE DISCLOSURE

Technical Field

The present disclosure relates to a neural processing unit (NPU) capable of reusing data and to a method of operating the NPU. More specifically, the present disclosure relates to an NPU and NPU operating method in which weights are reused during a depth-wise convolution operation.

Background Art

Humans are equipped with intelligence that can perform recognition, classification, inference, prediction, and control/decision making. Artificial intelligence (AI) refers to artificially mimicking human intelligence.

The human brain is made up of numerous nerve cells called neurons, and each neuron is connected to hundreds to thousands of other neurons through connections called synapses. In order to imitate human intelligence, the modeling of the operating principle of biological neurons and the connection relationship between neurons is called an artificial neural network (ANN) model. That is, an artificial neural network is a system that connects nodes that mimic neurons in a layer structure.

These artificial neural network models are divided into "single-layer neural network" and "multi-layer neural network" according to the number of layers.

A general multi-layer neural network consists of an input layer, a hidden layer, and an output layer, wherein (1) the input layer is a layer that receives external data, and the number of neurons in the input layer is the same as the number of input variables, (2) the hidden layer is located between the input layer and the output layer, receives a signal from the input layer, extracts characteristics, and transmits it to the output layer, and (3) the output layer receives a signal from the hidden layer and outputs it to the outside. The input signal between neurons is multiplied by each connection strength with a value between zero and one and then summed. If this sum is greater than the neuron threshold, the neuron is activated and implemented as an output value through the activation function.

Meanwhile, in order to implement higher artificial intelligence, an increase in the number of hidden layers of an artificial neural network is called a deep neural network (DNN).

There are several types of DNNs, but convolutional neural networks (CNNs) are known to be easy to extract features from input data and identify patterns of features.

A CNN refers to a network structure in which operations between neurons of each layer are implemented by convolution of a matrix-type input signal and a matrix-type weight kernel.

Convolutional neural networks are neural networks that function similar to image processing in the visual cortex of the human brain. Convolutional neural networks are known to be suitable for object classification and detection.

Referring to FIG. 3, the convolutional neural network is configured in a form in which convolutional channels and pooling channels are alternatively repeated. In a convolutional neural network, most of the computation time is occupied by the operation of convolution.

A convolutional neural network inferences objects by extracting image features of each channel by a matrix-type kernel, and providing homeostasis such as movement or distortion by pooling. For each channel, a feature map is obtained by convolution of the input data and the kernel, and an activation function such as Rectified Linear Unit (ReLU) is applied to generate an activation map of the corresponding channel. Pooling may then be applied.

The neural network that actually classifies the pattern is located at the end of the feature extraction neural network, and is called a fully connected layer. In the computational processing of convolutional neural networks, most computations are performed through convolution or matrix multiplication.

At this time, the necessary weight kernels are read from memory quite frequently. A significant portion of the operation of the convolutional neural network takes time to read the weight kernels corresponding to each channel from the memory.

The memory may be divided into main memory, internal memory, and on-chip memory. Each memory consists of a plurality of memory cells, and each memory cell of the memory has a unique memory address. When the neural processing unit reads a weight or a parameter stored in the main memory, a latency of several clock cycles may occur until the memory cell corresponding to the address of the memory is accessed. This delay time may include column address strobe (CAS) latency and row address strobe (RAS) latency.

Therefore, there is a problem in that the time and power consumed to read the necessary parameters from the main memory and perform the convolution are significant.

SUMMARY OF THE DISCLOSURE

The inventor of the present disclosure has recognized the following matters.

First, the inventor of the present disclosure has recognized that, during inference of the ANN model, the neural processing unit (NPU) frequently reads the feature map or weight kernel of a specific layer of the ANN model from the main memory.

The inventor of the present disclosure has recognized that the reading operations of the feature map or kernel of the ANN model from the main memory to NPU is slow and consumes a lot of energy.

The inventor of the present disclosure has recognized that increased access to on-chip memory or NPU internal memory, rather than to main memory, can increase processing speed and reduce energy consumption.

The inventor of the present disclosure has recognized that, in a processing element array having a specific structure, a PE utilization rate (%) of the processing element array decreases rapidly in a specific convolution operation. For example, when there are one hundred processing elements in the processing element array, if only fifty processing elements are in operation, the utilization rate of the processing element array is 50%.

The inventor of the present disclosure has recognized that data reuse may be impossible during a depth-wise convolution operation in the specific structure of a processing element array, and thus the utilization rate of the processing element array rapidly decreases.

In particular, the inventor of the present disclosure has recognized that, in the case of depth-wise convolution, in which the utilization rate of the processing element array is lowered compared to standard or point-wise convolution, the resources, power, and processing time required for depth-wise convolution may become inefficient to the extent that they become substantially similar to standard or point-wise convolution operations even if the amount of computation of depth-wise convolution is relatively small compared to that of standard or point-wise convolution.

In particular, the inventor of the present disclosure has recognized that the performance of the NPU may be bottle-necked due to a low utilization rate of the processing element array even with a relatively small amount of computation of depth-wise convolution.

Accordingly, the present disclosure provides a neural processing unit capable of reusing weights during depth-wise convolution operation in an NPU, reducing the number of main memory read operations and reducing power consumption. The present disclosure also provides a method of operating the neural processing unit.

In order to solve the problems as described above, a neural processing unit according to an example of the present disclosure is provided.

According to an aspect of the present disclosure, there is provided a neural processing unit (NPU) including a mode selector configured to select a first mode or a second mode; and a processing element (PE) array operating in one of the first mode and the second mode and including a plurality of processing elements arranged in PE rows and PE columns, the PE array configured to receive an input of first input data and an input of second input data, respectively. In the second mode, the first input data may be inputted in a PE column direction of the PE array and may be transmitted along the PE column direction while being delayed by a specific number of clock cycles, and the second input data may be broadcast to the plurality of processing elements of the PE array to which the first input data is delayed by the specific number of clock cycles.

The PE array may be further configured to perform a point-wise convolution operation in the first mode.

The PE array may be further configured to perform a depth-wise convolution operation in the second mode.

The specific number of clock cycles may be determined based on a size of a weight kernel of an artificial neural network model or a stride value of the convolution.

In the first mode, the plurality of processing elements of each PE column of the PE array may be pipelined to transfer the first input data.

In the first mode, the second input data may be unicast to each of the plurality of processing elements of each PE row of the PE array.

The PE array may further include a delay buffer configured to output the first input data by delaying the first input data by the specific number of clock cycles.

The PE array may be further configured to determine the specific number of clock cycles based on a size of a weight kernel of an artificial neural network model.

In the second mode, the second input data may be broadcast to a PE column of the PE array through a signal line having a branch through which the first input data delayed by the specific number of clock cycles is applied to the signal line of the PE column.

In the second mode, the PE rows of the PE array may consist of a first group of PE rows configured to be activated based on a size of a weight kernel of an artificial neural network model and a second group of PE rows that excludes the PE rows of the first group and is configured to be deactivated.

The PE array may further include a first multiplexer disposed in at least some of the PE rows; a second multiplexer disposed at an input portion of the at least some of the PE rows; and a delay buffer disposed in the at least some of the PE rows.

According to another aspect of the present disclosure, there is provided a neural processing unit (NPU) including a mode selector configured to select a first mode or a second mode; and a processing element (PE) array including a plurality of processing elements arranged in PE rows and PE columns, the PE array configured to perform a first convolution operation in the first mode and perform a second convolution operation in the second mode. The PE array may be further configured to reuse weight data for the second convolution operation within the PE array.

The first convolution operation may include a standard or point-wise convolution operation.

The second convolution operation may include a depth-wise convolution operation.

The PE array may be configured to include a delay buffer configured for reuse of the weight data of a depth-wise convolution operation.

In the first mode, the PE array may be further configured to receive an input of the weight data that is used for the first convolution operation and is inputted to a pipelined processing element of each PE column of the PE array, and an input of feature map data that is used for the first convolution operation and is unicast to each PE of the PE rows of the PE array.

The NPU may further include a delay buffer disposed in at least some of the PE rows of the PE array, the delay buffer configured in the second mode to receive an input of the weight data that is used for the second convolution operation, and an input of the weight data that is delayed by the delay buffer and is outputted from the delay buffer.

The PE array may further include a delay buffer configured to delay the weight data by a predetermined number of clock cycles, and the delay buffer may be further configured to be delayed based on a size of a weight kernel of an artificial neural network model.

According to another aspect of the present disclosure, there is provided a neural processing unit (NPU) including a weight storage unit configured to load weight data used for a convolution operation; a feature map storage unit configured to load feature map data used for the convolution operation; and a processing element (PE) array including a plurality of processing elements and a plurality of delay units arranged to correspond to at least some of the processing elements of the PE array, the plurality of delay units configured to selectively delay the weight data by a switch unit corresponding to the plurality of delay units.

According to another aspect of the present disclosure, there is provided a processing element array including a first processing element configured to receive weight data; a delay unit configured to receive the weight data, delay the weight data by a specific number of clock cycles, and transmit the weight data to a second processing element; and a broadcast signal line configured to provide feature map data simultaneously to the first processing element and the second processing element. The delay unit may be configured to process depth-wise convolution by reusing the weight data.

According to the present disclosure, by reusing the weights in the depth-wise convolution operation in the NPU, the number of main memory read operations can be reduced and power consumption can be reduced.

In addition, according to the present disclosure, power consumption may be minimized by deactivating processing elements that are not used during the depth-wise convolution operation.

In addition, according to the present disclosure, by delaying and reusing weights during the depth-wise convolution operation, it is possible to provide a neural processing unit that saves energy used in the NPU and has improved efficiency and throughput of the processing element array.

The effects according to the present disclosure are not limited to the contents exemplified above, and more various effects are included in the present specification.

BRIEF DESCRIPTION OF THE DRAWINGS

FIG. 14 is an exemplary diagram for explaining a depth-wise convolution operation on weight data and feature map data according to an example of the present disclosure.

FIG. 17 is an exemplary diagram for explaining a depth-wise convolution operation on weight data and feature map data according to an example of the present disclosure.

DETAILED DESCRIPTION OF THE EMBODIMENT

Figure 1:
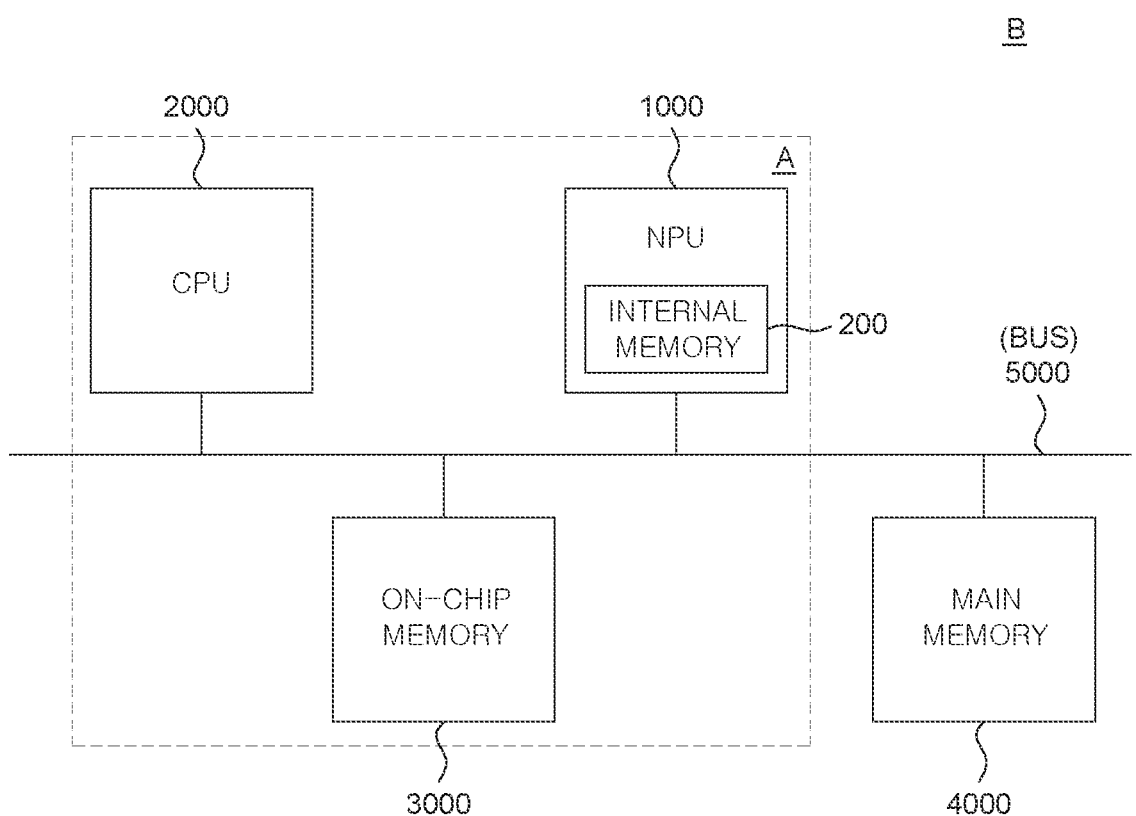
FIG. 1 is a schematic conceptual diagram illustrating an apparatus including a neural processing unit according to an example of the present disclosure.

Particular structural or step-by-step descriptions for examples according to the concept of the present disclosure disclosed in the present specification or application are merely exemplified for the purpose of explaining the examples according to the concept of the present disclosure. Examples according to the concept of the present disclosure may be embodied in various forms, and examples according to the concept of the present disclosure may be embodied in various forms, and should not be construed as being limited to the examples described in the present specification or application.

Since the examples according to the concept of the present disclosure may have various modifications and may have various forms, specific examples will be illustrated in the drawings and described in detail in the present specification or application. However, this is not intended to limit the examples according to the concept of the present disclosure with respect to the specific disclosure form, and should be understood to include all modifications, equivalents, and substitutes included in the spirit and scope of the present disclosure.

Terms such as first and/or second may be used to describe various elements, but the elements should not be limited by the terms. The above terms are only for the purpose of distinguishing one element from another element, for example, without departing from the scope according to the concept of the present disclosure, and a first element may be termed a second element, and similarly, a second element may also be termed a first element.

When an element is referred to as being "connected to" or "in contact with" another element, it is understood that the other element may be connected to or in contact with the other element, but other elements may be disposed therebetween. On the other hand, when it is mentioned that a certain element is "directly connected to" or "in direct contact with" another element, it should be understood that no other element is present therebetween. Other expressions describing the relationship between elements, such as "between" and "immediately between" or "adjacent to" and "directly adjacent to," etc., should be interpreted similarly.

In this present disclosure, expressions such as "A or B," "at least one of A or/and B," or "one or more of A or/and B" may include all possible combinations thereof. For example, "A or B," "at least one of A and B," or "at least one of A or B" may refer to both (1) including at least one A, (2) including at least one B, or (3) including both at least one A and at least one B.

As used herein, expressions such as "first," "second," and "first or second" may modify various elements, regardless of order and/or importance. In addition, it is used only to distinguish one element from other elements, and does not limit the elements. For example, the first user apparatus and the second user apparatus may represent different user apparatus regardless of order or importance. For example, without departing from the scope of rights described in this disclosure, the first element may be named as the second element, and similarly, the second element may also be renamed as the first element.

Terms used in present disclosure are only used to describe specific examples, and may not be intended to limit the scope of other examples. The singular expression may include the plural expression unless the context clearly dictates otherwise. Terms used herein, including technical or scientific terms, may have the same meanings as commonly understood by one of ordinary skill in the art described in this document.

Among terms used in present disclosure, terms defined in a general dictionary may be interpreted as having the same or similar meaning as the meaning in the context of a related art. Also, unless explicitly defined in this document, it should not be construed in an ideal or overly formal sense. In some cases, even terms defined in the present disclosure cannot be construed to exclude examples of the present disclosure.

The terms used herein are used only to describe specific examples, and are not intended to limit the present disclosure. The singular expression may include the plural expression unless the context clearly dictates otherwise. It should be understood that as used herein, terms such as "comprise" or "have" are intended to designate that the stated feature, number, step, action, component, part, or combination thereof exists, but it does not preclude the possibility of addition or existence of at least one other features or numbers, steps, operations, elements, parts, or combinations thereof.

Unless defined otherwise, all terms used herein, including technical or scientific terms, have the same meaning as commonly understood by one of ordinary skill in the art to which this disclosure pertains. Terms such as those defined in a commonly used dictionary should be interpreted as having a meaning consistent with the meaning in the context of a related art, and should not be interpreted in an ideal or excessively formal meaning unless explicitly defined in the present specification.

Each of the features of the various examples of the present disclosure may be partially or wholly combined or combined with each other. In addition, as those skilled in the art can fully understand, technically various interlocking and driving are possible, and each example may be implemented independently of each other or may be implemented together in a related relationship.

In describing the embodiments, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Hereinafter, in order to facilitate understanding of the disclosures presented in the present specification, terms used in the present specification will be briefly summarized.

NPU: an abbreviation of neural processing unit, which may refer to a processor specialized for computation of an artificial neural network model separately from a central processing unit (CPU).

ANN: an abbreviation of artificial neural network. It may refer to a network in which nodes are connected in a layer structure to imitate human intelligence by mimicking those neurons in the human brain are connected through synapse.

ANN information: information including network structure information, information on the number of layers, connection relationship information of each layer, weight information of each layer, information on calculation processing methods, activation function information, and the like.

DNN: an abbreviation of deep neural network, which may mean that the number of hidden layers of the artificial neural network is increased in order to implement higher artificial intelligence.

CNN: an abbreviation for convolutional neural network, which is a neural network that functions similar to image processing in the visual cortex of the human brain. Convolutional neural networks are known to be suitable for image processing, and are known to be superior to extract features from input data and identify patterns of features.

Kernel: the weight value of an N×M matrix for convolution. Each layer of the ANN model has a plurality of kernels, and the number of kernels may be referred to as the number of channels or the number of filters.

Hereinafter, the present disclosure will be described in detail by describing examples of the present disclosure with reference to the accompanying drawings.

FIG. 1 illustrates an apparatus including a neural processing unit according to an example of the present disclosure.

Referring to FIG. 1, a device B including an NPU 1000 includes an on-chip area A. Each element of the device B may be connected by an interface, a system-bus, and/or a wiring. That is, each element of the device B may communicate with a bus 5000. The device B may include a neural processing unit (NPU) 1000, a central processing unit (CPU) 2000, an on-chip memory 3000, and a main memory 4000.

The main memory 4000 is disposed outside the on-chip area A and may include ROM, SRAM, DRAM, resistive RAM, magneto-resistive RAM, phase-change RAM, ferroelectric RAM, flash-memory, or high bandwidth memory (HBM). The main memory 4000 may be configured with at least one memory unit. The main memory 4000 may be configured as a homogeneous memory unit or a heterogeneous memory unit.

The NPU 1000 is a processor specialized to perform an operation for an ANN. The NPU 1000 may include an internal memory 200.

The internal memory 200 may include a volatile memory and/or a non-volatile memory. For example, the internal memory 200 may include ROM, SRAM, DRAM, resistive RAM, magneto-resistive RAM, phase-change RAM, ferroelectric RAM, flash memory, or HBM. The internal memory 200 may include at least one memory unit. The internal memory 200 may be configured as a homogeneous memory unit or a heterogeneous memory unit.

The on-chip memory 3000 may be disposed in the on-chip area A. The on-chip memory 3000 may be a memory mounted on a semiconductor die and may be a memory for caching or storing data processed in the on-chip area A. The on-chip memory 3000 may include ROM, SRAM, DRAM, resistive RAM, magneto-resistive RAM, phase-change RAM, ferroelectric RAM, flash memory, and HBM. The on-chip memory 3000 may include at least one memory unit. The on-chip memory 3000 may be configured as a homogeneous memory unit or a heterogeneous memory unit.

The CPU 2000 may be disposed in the on-chip area A and may include a general-purpose processing unit. The CPU 2000 may be operatively connected to the NPU 1000, the on-chip memory 3000, and the main memory 4000.

The device B including the NPU 1000 may include at least one of the internal memory 200, the on-chip memory 3000, and the main memory 4000 of the aforementioned NPU 1000. However, the present disclosure is not limited thereto.

Hereinafter, references to the "at least one memory" is intended to include at least one of the internal memory 200, the on-chip memory 3000, and the main memory 4000. Also, the description of the on-chip memory 3000 is intended to include the internal memory 200 of the NPU 1000 or a memory external to the NPU 1000 but disposed in the on-chip area A.

Figure 20:
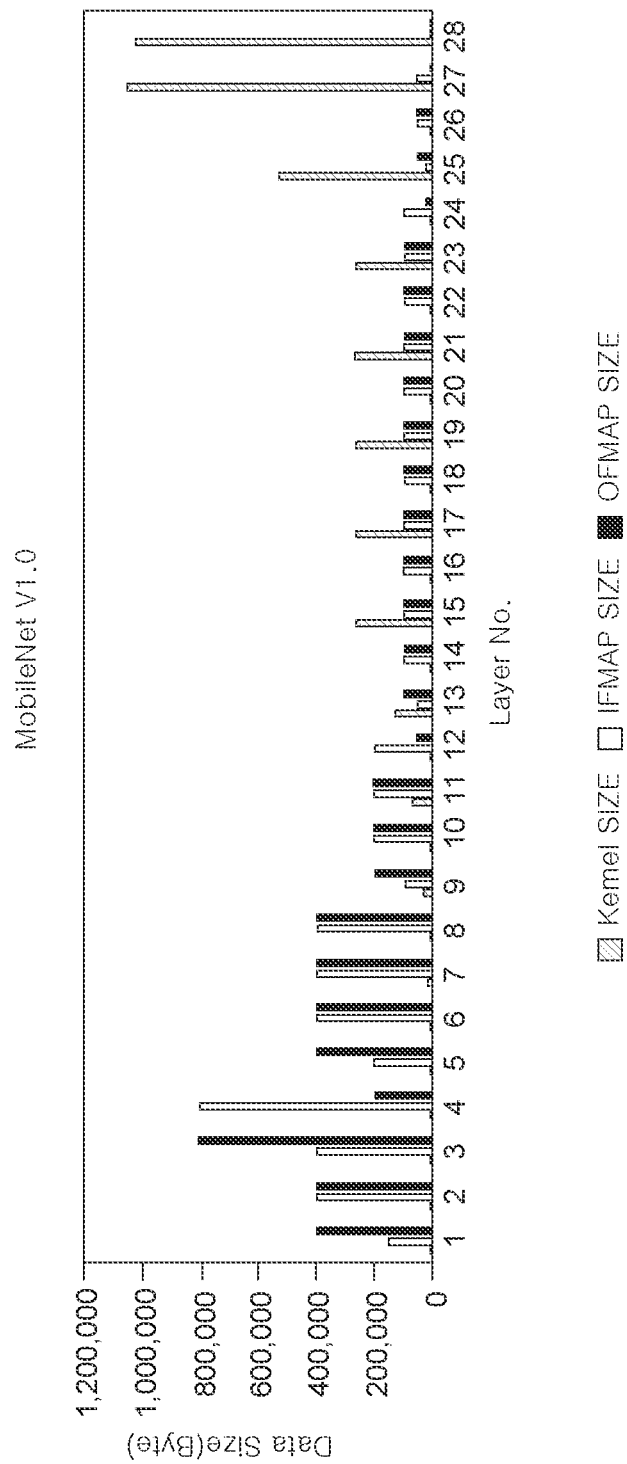
FIG. 20 is a conceptual diagram for explaining an exemplary ANN model.

Hereinafter, the ANN model will be described with reference to FIG. 20, which is a conceptual diagram for explaining an exemplary ANN model configured to include a multi-layer structure. Referring to FIG. 20, a MobileNet V1.0 model may have 28 layers.

An ANN refers to a network composed of artificial neurons that, when an input signal is received, applies a weight to the input signal and selectively applies an activation function. Such an ANN can be used to output inference results from input data.

The NPU 1000 of FIG. 1 may be a semiconductor apparatus implemented as an electric/electronic circuit. The electric/electronic circuit may mean including a number of electronic devices (e.g., a transistor or a capacitor).

The NPU 1000 may include a processing element array, an internal memory 200, a controller, and an interface. Each of the processing element array, the internal memory 200, the controller, and the interface may be a semiconductor circuit to which numerous transistors are connected. Therefore, some of transistors may be difficult or impossible to identify and distinguish with the naked eye, and may be identified only by its functionality. For example, any circuit may operate as an array of processing elements, or as a controller.

The NPU 1000 may include a processing element array, an internal memory 200 configured to store at least a portion of an ANN model that can be inferred from the processing element array, and a scheduler configured to control a processing element array and an internal memory 200 based on the data locality information or information on the structure of the ANN model. Here, the ANN model may include information on data locality information or structure of the ANN model. However, the present disclosure is not limited thereto. The ANN model may refer to an AI recognition model trained to perform a specific inference function.

For example, the ANN model may be a model trained to perform an inference operation such as object-detection, object-segmentation, image/video reconstruction, image/video enhancement, object-tracking, event recognition, event prediction, anomaly detection, density estimation, event search, measurement, and the like.

For example, the ANN model can be a model such as Bisenet, Shelfnet, Alexnet, Densenet, Efficientnet, EfficientDet, Googlenet, Mnasnet, Mobilenet, Resnet, Shufflenet, Squeezenet, VGG, Yolo, RNN, CNN, DBN, RBM, LSTM, and the like. However, the present disclosure is not limited thereto, and brand-new ANN models to be operated in the NPU are being continuously released.

The PE array may perform operations for the ANN. For example, when input data is input, the PE array may perform training of the ANN. Also, when input data is input, the PE array may perform an operation of deriving an inference result through the trained ANN model.

For example, the NPU 1000 may call at least a portion of the data of the ANN model stored in the main memory 4000 to the internal memory 200 through the interface.

The controller may be configured to control an operation on PE array for an inference processing and control the read and write sequence of the internal memory 200. Further, the controller may be configured to resize at least a portion of a batch of channels corresponding to the input data.

According to the structure of the ANN model, calculations for each layer may be sequentially performed. That is, when the structure of the ANN model is determined, the operation sequence for each layer may be determined. Depending on the size of the internal memory 200 or the on-chip memory 3000 of the NPU 1000, the operation for each layer may not be processed at once. In this case, the NPU 1000 may divide one operation processing step into a plurality of operation processing steps by tiling the corresponding layer to an appropriate size. The structure of the ANN model and the sequence of operation or data flow according to the hardware constraint of the NPU 1000 may be defined as data locality of the ANN model inferred from the NPU 1000.

That is, when the compiler compiles the ANN model so that the ANN model is executed in the NPU 1000, the ANN data locality of the ANN model at the NPU-memory level can be reconstructed. For example, the compiler may be executed by the CPU 2000. Alternatively, the compiler may run on a separate machine.

That is, according to the compiler, the algorithms applied to the ANN model, and the operating characteristics of the NPU 1000, the size of weight values, and the number of feature maps or channels, the size and sequence of data required for processing the ANN model loaded into the internal memory 200 may be determined.

For example, even in case of the same ANN model, the calculation method of the ANN model to be processed may be configured according to the method and the characteristics in which the NPU 1000 calculates the corresponding ANN model, for example, feature map tiling method, stationary method of processing elements and the like, the number of processing elements of the NPU 1000, the size of the feature map and the size of the weight in the NPU 1000, the internal memory capacity, the memory hierarchy of the NPU 1000, and algorithmic characteristic of the compiler that determines the sequence of operations of the NPU 1000 for processing the ANN model. This is because even if the same ANN model is processed by the above-mentioned factors, the NPU 1000 may differently determine the sequence of data required at each moment in each clock cycle.

Hereinafter, the above compiler will be described in detail with reference to FIG. 2, which illustrates a compiler 6000 related to the present disclosure.

Figure 2:
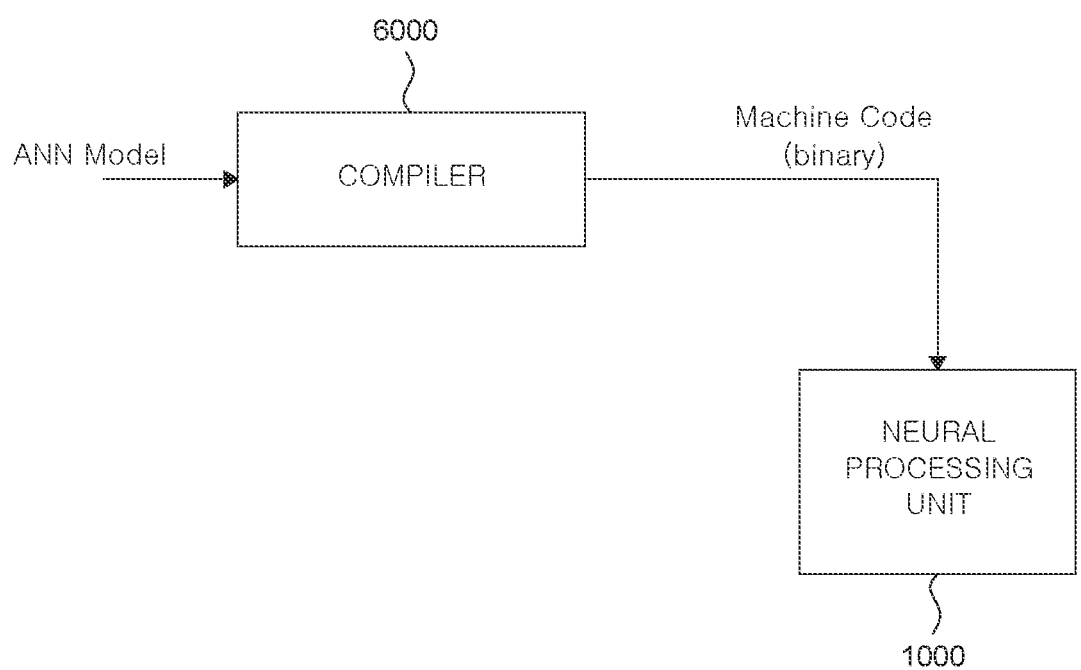
FIG. 2 is a schematic conceptual diagram illustrating a compiler related to the present disclosure.

Referring to FIG. 2, the compiler 6000 has a frontend and a backend, and an intermediate representation (IR) used for program optimization exists between the frontend and the backend. For example, the compiler 6000 may be configured to receive an ANN model generated by a deep learning framework provided by ONNX, TensorFlow, PyTorch, mxnet, Keras, and the like.

The front-end may perform hardware-independent transformation and optimization on the input ANN model, and the intermediate representation is used to represent the source code. The backend may generate machine code in binary form (i.e., code that can be used in the NPU 1000) from the source code.

Furthermore, the compiler 6000 may analyze the convolution method of the ANN model to generate mode information including information on all operations to be performed by the NPU 1000, so as to provide the generated mode information to the NPU 1000. Here, the mode information may include information on the first convolution operation and/or the second convolution operation for each layer, each channel, or each tile of the ANN model. For example, the first convolution operation may include a standard convolution operation or a point-wise convolution operation, and the second convolution operation may include a depth-wise convolution operation, but is not limited thereto.

Based on the provided mode information as described above, the NPU 1000 may determine an operation mode and perform an arithmetic operation according to the determined operation mode.

Hereinafter, a convolutional neural network (CNN), which is a type of a deep neural network (DNN) among a plurality of ANNs, will be described in detail with reference to FIG. 3.

Figure 3:
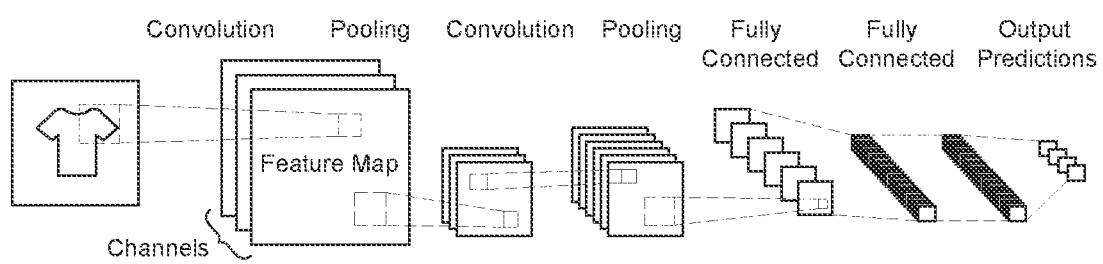
FIG. 3 is a schematic conceptual diagram illustrating a convolutional neural network according to the present disclosure.

FIG. 3 illustrates a convolutional neural network according to the present disclosure.

The CNN may be a combination of one or several convolutional layers, a pooling layer, and a fully connected layer. The CNN has a structure suitable for learning and inferencing of two-dimensional data, and can be trained through a backpropagation algorithm.

In the example of the present disclosure, in the CNN, there is a kernel (i.e., a weight kernel) for extracting features of an input image of a channel for each channel. The kernel may be composed of a two-dimensional matrix, and convolution operation is performed while traversing input data. The size of the kernel may be arbitrarily determined, and the stride at which the kernel traverses input data may also be arbitrarily determined. A result of convolution of all input data per kernel may be referred to as a feature map or an activation map. Hereinafter, the kernel may include a set of weight values or a plurality of sets of weight values. The number of kernels for each layer may be referred to as the number of channels.

As such, since the convolution operation is an operation formed by combining input data and a kernel, an activation function for adding non-linearity may be applied thereafter. When an activation function is applied to a feature map that is a result of a convolution operation, it may be referred to as an activation map.

Specifically, referring to FIG. 3, the CNN may include at least one convolutional layer, at least one pooling layer, and at least one fully connected layer.

For example, a convolution may be defined by two main parameters that the size of the input data (typically a 1×1, 3×3 or 5×5 matrix) and the depth of the output feature map (the number of kernels). These key parameters can be computed by convolution. These convolutions may start at depth 32, continue to depth 64, and end at depth 128 or 256. The convolution operation may be referred to as an operation of sliding a kernel of size 3×3 or 5×5 over the input image matrix, which is the input data, multiplying each element of the kernel and each element of the input image matrix that overlaps, and then adding them all together.

An activation function may be applied to the output feature map to finally output the activation map. The pooling layer may perform a pooling operation to reduce the size of the feature map by down sampling the output data (i.e., the activation map). For example, the pooling operation may include, but is not limited thereto, max pooling and/or average pooling.

The maximum pooling operation uses the kernel, and outputs the maximum value in the area of the feature map overlapping the kernel by sliding the feature map and the kernel. The average pooling operation outputs the average value within the area of the feature map overlapping the kernel by sliding the feature map and the kernel. As such, since the size of the feature map is reduced by the pooling operation, the number of parameters of the feature map is also reduced.

The fully connected layer may classify data output through the pooling layer into a plurality of classes (i.e., inferenced values), and may output the classified class and a score thereof. Data output through the pooling layer forms a three-dimensional feature map, and this three-dimensional feature map can be converted into a one-dimensional vector and input as a fully connected layer.

Hereinafter, an NPU will be described in detail with reference to FIG. 4.

Figure 4:
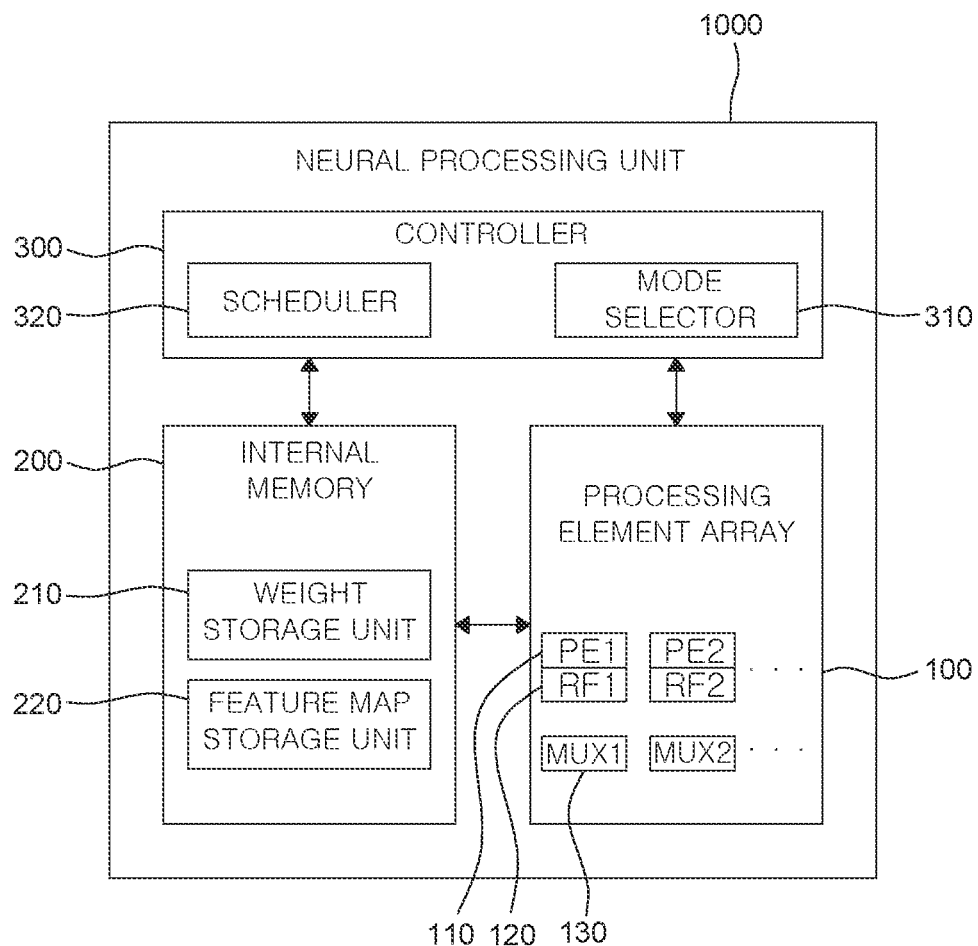
FIG. 4 is a schematic conceptual diagram illustrating a neural processing unit according to an example of the present disclosure.

FIG. 4 illustrates a neural processing unit according to an example of the present disclosure.

Referring to FIG. 4, a neural processing unit (NPU) 1000 includes a processing element array (PE array) 100, an internal memory 200, and a controller 300.

The PE array 100 may be configured to include a plurality of processing elements (PE1, PE2, . . . ) 110 configured to calculate node data of an ANN and weight data of a connection network. Each processing element may include a multiply and accumulate (MAC) operator and/or an arithmetic logic unit (ALU) operator. However, examples according to the present disclosure are not limited thereto.

In addition, the processing elements 110 as described is an example merely for convenience of explanation, and the number of the plurality of processing elements 110 is not limited. The size or number of the PE array may be determined by the number of the plurality of processing elements 110. The size of the PE array may be implemented in the form of an N×M matrix. where N and M are integers greater than zero. Accordingly, the PE array 100 may include N×M processing elements.

The size of the PE array 100 may be designed in consideration of the characteristics of the ANN model in which the NPU 1000 operates. In other words, the number of processing elements may be determined in consideration of a data size of an ANN model to be operated, a required amount of computation, and required power consumption. The data size of the ANN model may be determined in correspondence with the number of layers of the ANN model and the weight data size of each layer.

Accordingly, the size of the PE array 100 according to an example of the present disclosure is not limited. As the number of processing elements 110 of the PE array 100 increases, the parallel computing power of the processing ANN model may increase, but the manufacturing cost of the NPU 1000 and the physical chip size may increase.

For example, the ANN model operated in the NPU 1000 may be an ANN trained to detect thirty specific keywords, that is, an AI keyword recognition model. In this case, the size of the PE array 100 be designed to be 4×3 in consideration of the computational amount characteristic. In other words, the PE array 100 may be configured to include twelve processing elements. However, it is not limited thereto, and the number of the plurality of processing elements 110 may be selected within a range of, for example, 8 to 16,384. That is, examples of the present disclosure are not limited in the number of processing elements.

The PE array 100 may be configured to perform functions such as addition, multiplication, and accumulation required for ANN operation. In other words, the PE array 100 may be configured to perform a multiplication and accumulation (MAC) operation.

Hereinafter, one processing element of the processing element array 100 of FIG. 4 will be described in detail with reference to FIG. 5.

Figure 5:
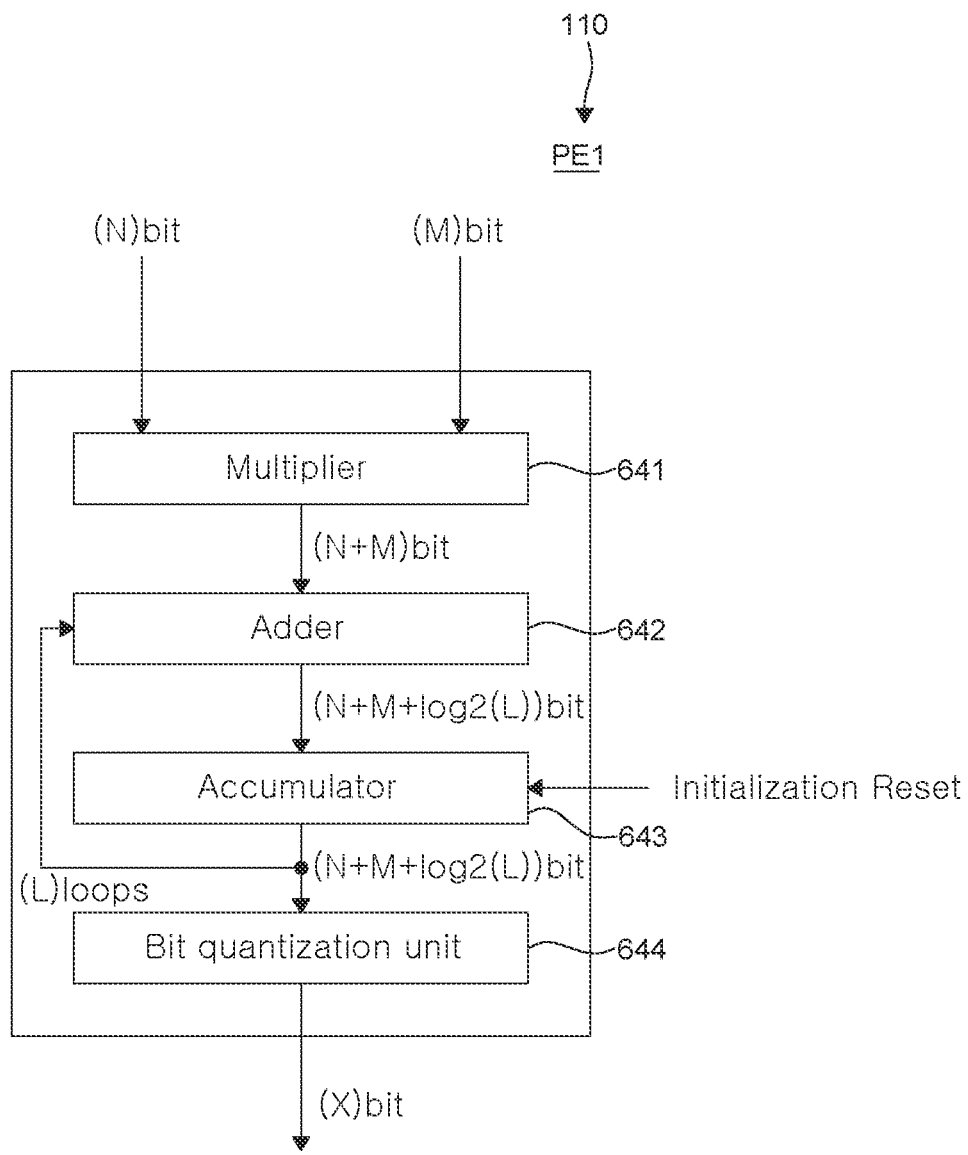
FIG. 5 is a schematic conceptual diagram illustrating one processing element of an array of processing elements related to the present disclosure.

FIG. 5 illustrates one processing element (e.g., PE1) of an array of processing elements related to the present disclosure.

Referring to FIG. 5, the first processing element PE1 (110) may include a multiplier 641, an adder 642, and an accumulator 643. The first processing element PE1 may optionally include a bit quantization unit 644. However, examples according to the present disclosure are not limited thereto, and the PE array 100 may be variously modified in consideration of the computational characteristics of the ANN.

The multiplier 641 multiplies the received (N)-bit data and (M)-bit data. The operation value of the multiplier 641 may be output as (N+M) bit data, where N and M are integers greater than zero. The first input unit receiving (N) bit data may be configured to receive a value having a characteristic such as a variable, and the second input unit receiving the (M) bit data may be configured to receive a value having a characteristic such as a constant.

For example, the first input unit may receive feature map data. That is, since the feature map data may be data obtained by extracting features such as an input image and voice, it may be data input from the outside such as a sensor in real time. The feature map data input to the processing element may be referred to as input feature map data. The feature map data output from the processing element after the MAC operation is completed may be referred to as output feature map data. The NPU 1000 may further selectively apply additional operations such as batch normalization, pooling, and activation functions to the output feature map data.

For example, the second input unit may receive a weight, that is, kernel data. That is, when training of the weight data of the ANN model is completed, the weight data of the ANN model may not be changed unless separate training is performed.

That is, the multiplier 641 may be configured to receive one variable and one constant. In more detail, the variable value input to the first input unit may be feature map data of the ANN model. The constant value input to the second input unit may be weight data of the ANN model.

As such, when the controller 300 controls the internal memory 200 by classifying the characteristics of the variable value and the constant value, the controller 300 may increase the memory reuse rate of the internal memory 200.

However, input data of the multiplier 641 is not limited to constant values and variable values. That is, according to the examples of the present disclosure, since the input data of the processing element may operate by understanding the characteristics of the constant value and the variable value, the operation efficiency of the NPU 1000 may be improved. However, the operation of the NPU 1000 is not limited to the characteristics of constant values and variable values of input data.

Based on this, the controller 300 may be configured to improve the memory reuse rate in consideration of the characteristic of the constant value.

Referring to FIG. 20 again, the controller 300 may confirm that the kernel size, input feature map size, and output feature map size of each layer of the ANN model are different from each other.

For example, when the size of the internal memory 200 is determined and when the size of the input feature map and the output feature map of a specific layer or a tile of a specific layer are smaller than the internal memory 200 capacity, then the controller 300 may control the NPU 1000 to reuse the feature map data.

For example, when the size of the internal memory 200 is determined, when the weight of a specific layer or a tile of a specific layer is significantly small, the controller 300 may control the NPU 1000 to reuse the feature map data. Referring back to FIG. 20, it can be seen that the weights of the first to eighth layers are very small. Accordingly, the controller 300 may control the internal memory 200 so that the weight remains in the internal memory 200 for a particular time so as to reuse the weight.

That is, the controller 300 may recognize each reusable variable data based on data locality information or structure information including the data reuse information of the ANN model, and selectively controls the internal memory 200 to reuse the data stored in the memory.

That is, the controller 300 may recognize each reusable constant data based on data locality information or structure information including the data reuse information of the ANN model, and selectively controls the internal memory 200 to reuse the data stored in the memory. For the above operation, the compiler 500 or the controller 300 may classify the size of weight data below the threshold size of the ANN model.

That is, the controller 300 may recognize reusable variable values and reusable constant values based on data locality information or structure information including the data reuse information of the ANN model, respectively, and thus, it is possible to selectively control the internal memory 200 to reuse the data stored in the memory.

Meanwhile, when a value of zero is inputted to one of the first input unit and the second input unit of the multiplier 641, the first processing element PE1 may recognize that the operation result is zero even if no operation is performed, and thus, the operation of the multiplier 641 may be limited so that the operation is not performed.

For example, when zero is inputted to one of the first input unit and the second input unit of the multiplier 641, the multiplier 641 may be configured to operate in a zero-skipping manner.

The bit width of data input to the first input unit and the second input unit of the multiplier 641 may be determined according to quantization of each feature map and weight of the ANN model. For example, when the feature map of the first layer is quantized to five bits and the weight of the first layer is quantized to seven bits, the first input unit may be configured to receive 5-bit width data, and the second input unit may be configured to receive 7-bit width data.

The NPU 1000 may control the first processing element PE1 such that the quantized bit width is converted in real time when the quantized data stored in the internal memory 200 is input to the first processing element PE1. That is, the quantized bit width may be different for each layer. Accordingly, the first processing element PE1 may receive bit width information from the NPU 1000 whenever the bit width of input data is converted, and converts the bit width based on the provided bit width information to generate input data.

The adder 642 adds the calculated value of the multiplier 641 and the calculated value of the accumulator 643. When L loops is 0, since there is no accumulated data, the operation value of the adder 642 may be the same as the operation value of the multiplier 641. When L loops is 1, a value obtained by adding an operation value of the multiplier 641 and an operation value of the accumulator 643 may be an operation value of the adder 642.

The accumulator 643 temporarily stores the data output from the output unit of the adder 642 so that the operation value of the adder 642 and the operation value of the multiplier 641 are accumulated by the number of L loops. Specifically, the calculated value of the adder 642 output from the output unit of the adder 642 is input to the input unit of the accumulator 643. The operation value input to the accumulator is temporarily stored in the accumulator 643 and is output from the output unit of the accumulator 643. The output operation value is input to the input unit of the adder 642 by a loop. At this time, the operation value newly output from the output unit of the multiplier 641 is inputted to the input unit 642 of the adder. That is, the operation value of the accumulator 643 and the new operation value of the multiplier 641 are input to the input unit of the adder 642, and these values are added by the adder 642 and outputted through the output unit of the adder 642. The data output from the output unit of the adder 642, that is, a new operation value of the adder 642, is input to the input unit of the accumulator 643, and subsequent operations are performed substantially the same as the above-described operations as many times as the number of loops.

As such, the accumulator 643 temporarily stores the data output from the output unit of the adder 642 in order to accumulate the operation value of the multiplier 641 and the operation value of the adder 642 by the number of loops. Accordingly, data input to the input unit of the accumulator 643 and data output from the output unit may have the same bit width as the data output from the output unit of the adder 642, which is (N+M+log 2(L)) bits, where L is an integer greater than zero.

When the accumulation is finished, the accumulator 643 may receive an initialization reset signal to initialize the data stored in the accumulator 643 to zero. However, examples according to the present disclosure are not limited thereto.

The bit quantization unit 644 may reduce the number of bits of data output from the accumulator 643. The bit quantization unit 644 may be controlled by the controller 300. The number of bits of the quantized data may be output as X bits, where X is an integer greater than zero. According to the above configuration, the PE array 100 is configured to perform a MAC operation, and the PE array 100 has an effect of quantizing and outputting the MAC operation result. In particular, such quantization has the effect of further reducing power consumption as the number of L loops increases. In addition, if the power consumption is reduced, there is an effect that the heat generation of the edge device can also be reduced. In particular, reducing heat generation has an effect of reducing the possibility of malfunction due to high temperature of the NPU 1000.

The output data of X bits of the bit quantization unit 644 may be node data of a next layer or input data of convolution. If the ANN model has been quantized, the bit quantization unit may be configured to receive quantized information from the ANN model. However, it is not limited thereto, and the NPU controller 300 may be configured to extract quantized information by analyzing the ANN model. Therefore, the output data X bits may be converted into the quantized number of bits to correspond to the quantized data size and output. The output data X bit of the bit quantization unit 644 may be stored in the internal memory 200 as the number of quantized bits.

Each processing element 110 of the NPU 1000 according to an example of the present disclosure may reduce the number of bits of (N+M+log 2(L)) bit data output from the accumulator 643 by the bit quantization unit 644 to the number of bits of X bit. The NPU controller 300 may control the bit quantization unit 644 to reduce the number of bits of the output data by a predetermined bit from a least significant bit (LSB) to a most significant bit (MSB).

When the number of bits of output data is reduced, power consumption, calculation amount, and memory usage of the NPU 1000 may be reduced. However, when the number of bits is reduced below a specific bit width, there may be a problem in that the inference accuracy of the ANN model may be rapidly reduced. Accordingly, the reduction in the number of bits of the output data, that is, the quantization degree, can be determined by comparing the reduction in power consumption, the amount of computation, and the amount of memory usage compared to the reduction in inference accuracy of the ANN model. It is also possible to determine the quantization degree by determining the target inference accuracy of the ANN model and testing it while gradually reducing the number of bits. The quantization degree may be determined for each operation value of each layer.

According to the above-described PE1, by adjusting the number of bits of N-bit data and M-bit data of the multiplier 641 and reducing the number of bits of the operation value X bit by the bit quantization unit 644, a PE has the effect of reducing power consumption while improving the MAC operation speed, and has the effect of more efficiently performing the convolution operation of the ANN.

Based on this, the internal memory 200 of the NPU 1000 may be a memory system configured in consideration of the MAC operation characteristics and power consumption characteristics of the PE array 100.

For example, the NPU 1000 may be configured to reduce the bit width of the operation value of the PE array 100 in consideration of the MAC operation characteristics and power consumption characteristics of the PE array 100.

For example, the NPU 1000 may be configured to reduce the bit width of an operation value of the PE array 100 for reuse of a feature map or a weight of the internal memory 200.

The internal memory 200 of the NPU 1000 may be configured to minimize the power consumption of the NPU 1000.

The internal memory 200 of the NPU 1000 may be a memory system configured to control the memory with low-power in consideration of the parameter size and operation sequences of the ANN model to be operated.

The internal memory 200 of the NPU 1000 may be a low-power memory system configured to reuse a specific memory address in which weight data is stored in consideration of the data size and operation sequences of the ANN model.

The NPU 1000 may be configured to further include an operation unit configured to process various activation functions for imparting non-linearity. For example, the activation function may include a sigmoid function, a hyperbolic tangent (tan h) function, a ReLU function, a Leaky-ReLU function, a Maxout function, or an ELU function that derives a non-linear output value with respect to an input value. However, it is not limited thereto. Such activation function may be selectively applied after MAC operation. Such activation functions may be selectively applied after MAC operation. The operation value to which the activation function is applied to the feature map may be referred to as an activation map.

Referring back to FIG. 4, the internal memory 200 may be configured as a volatile memory. Volatile memory stores data only when power is supplied, and the stored data is destroyed when power supply is cut off. The volatile memory may include a static random access memory (SRAM), a dynamic random access memory (DRAM), and the like. The internal memory 200 may preferably be an SRAM, but is not limited thereto.

At least a portion of the internal memory 200 may be configured as a non-volatile memory. Non-volatile memory is memory that stores data even when power is not supplied. The non-volatile memory may include a read only memory (ROM) or the like. It is also possible to store the trained weights in the non-volatile memory. That is, the weight storage unit 210 may include a volatile memory or a non-volatile memory.

The internal memory 200 may include a weight storage unit 210 and a feature map storage unit 220. The weight storage unit 210 may store at least a portion of the weights of the ANN model, and the feature map storage unit 220 may store node data of the ANN model or at least a portion of the feature map.

The ANN data that may be included in the ANN model may include node data or feature maps of each layer, and weight data of each connection network connecting nodes of each layer. At least some of the data or parameters of the ANN may be stored in a memory provided inside the controller 300 or the internal memory 200.

Among the parameters of the ANN, the feature map may be configured as a batch-channel. Here, the plurality of batch-channels may be, for example, input images captured by a plurality of image sensors or cameras in a substantially the same period (e.g., within 10 ms or 100 ms).

Meanwhile, the controller 300 may be configured to control the PE array 100 and the internal memory 200 in consideration of the size of the weight values of the ANN model, the size of the feature map, and the calculation sequence of the weight values and the feature map.

The controller 300 may include a mode selector 310 and a scheduler 320.

The mode selector 310 may select whether the PE array 100 operates in the first mode or the second mode according to the size of the weight values, the size of the feature map, and the calculation sequence of the weight values and the feature map to be calculated in the PE array 100.

Here, the first mode is an operation mode for performing the first convolution operation, and the first convolution operation may be a standard convolution operation or a point-wise convolution operation, but is not limited thereto. The second mode is an operation mode for performing the second convolution operation, and the second convolution operation may be a depth-wise convolution operation, but is not limited thereto.

The mode selector 310 may transmit a selection signal indicating an operation mode selected among the first mode or the second mode to the PE array 100 so that the PE array 100 operates in the first mode or the second mode.

In various examples, the mode selector 310 may select whether to operate in the first mode or the second mode based on mode information provided from the compiler 500. For example, based on the mode information provided from the compiler 500, the mode selector 310 may select a first mode or a second mode, and transmits a selection signal indicating the selected first mode or second mode to the PE array 100.

Next, the scheduler 320 may control the PE array 100 and the internal memory 200 to operate according to the selected mode.

For example, when the mode selector 310 selects the first mode, the scheduler 320 loads weight data corresponding to the first input data into the weight storage unit 210 of the internal memory 200 and, the feature map data corresponding to the second input data may be loaded into the feature map storage unit 220 of the internal memory 200. The scheduler 320 may control the PE array 100 to calculate weight data and feature map data through a first convolution operation in each of a plurality of PEs constituting the PE array 100.

When the mode selector 310 selects the second mode, the scheduler 320 may load the weight data into the weight storage unit 210 and load the feature map data into the feature map storage unit 220 as described above. The controller 300 may control the PE array 100 to calculate weight data and feature map data through a second convolution operation in each of a plurality of PEs constituting the PE array 100.

Although the internal memory 200 is illustrated as including the weight storage unit 210 and the feature map storage unit 220 separately. However, this is only an example, and the internal memory 200 may be logically divided or variably divided through a memory address control or may not be divided.

In more detail, the size of the weight storage unit 210 and the size of the feature map storage unit 220 may be differently set for each layer and for each tile. Referring back to FIG. 20, it can be seen that the data size of the feature maps (IFMAP or OFMAP) of each layer and the data size of the weight are different for each layer.

In the example described above, it has been described that the parameters (e.g., weight and feature map) of the ANN are stored in the internal memory 200 of the NPU 1000, but the present disclosure is not limited thereto and may be stored in the on-chip memory 3000 or the main memory 4000.

On the other hand, the scheduling of a general CPU operates to achieve the best efficiency in consideration of fairness, efficiency, stability, response time, and the like. That is, it is scheduled to perform the most processing within the same time in consideration of priority, calculation time, and the like. Therefore, the conventional CPU uses an algorithm for scheduling tasks in consideration of data such as priority order of each processing and operation processing time.

Unlike this, the controller 300 is may select an operation mode and control the PE array 100 to perform a convolution operation according to the determined operation mode based on the calculation method of the parameters of the ANN model, in particular, based on the characteristics of the convolution operation method to be performed in the PE array 100.

Further, the controller 300 may control the PE array 100 to perform a first convolution operation such as a point-wise convolution operation in the first mode, and a second convolution operation such as a depth-wise convolution operation in the second mode.

In general, the point-wise convolution operation is an operation performed using kernel data in the form of a 1×1×M matrix, and the depth-wise convolution operation is an operation performed using kernel data in the form of an N×M×1 matrix. Here, N and M may be integers greater than zero, and N and M may be the same number.

When performing the depth-wise convolution operation, the NPU 1000 may perform the operation using only a portion of PE rows of the PE array 100 including a matrix of a plurality of PEs, so there may be some PEs that are not used for operation. In addition, even if the depth-wise convolution operation is performed using only some PE rows, the time required for the depth-wise convolution operation may not be faster than that of the point-wise convolution operation, so the depth-wise convolution operation in the NPU 1000 may become inefficient. That is, the utilization rate of the PE array 100 may be reduced.

To overcome this inefficiency, the present disclosure may propose a neural processing unit configured to minimize data movement between the main memory 4000 and the on-chip region A by allowing the PE array 100 to reuse weight data during a depth-wise convolution operation.

In order to overcome such inefficiency, the present disclosure may propose a neural processing unit configured to turn-off power to PEs that have not operated by reusing weight data in the PE array 100 during depth-wise convolution operation.

In order to overcome such inefficiency, the present disclosure may propose a neural processing unit having efficient computation performance while reducing the amount of time and power required for the depth-wise computation by reusing the weight data and/or the feature map data during the depth-wise convolution operation by the PE array 100.

Hereinafter, a PE array for the neural processing unit to operate the PE array according to the first mode or the second mode to reduce hardware resource usage and power consumption, and to have improved computational performance, will be described in detail.

Figure 6:
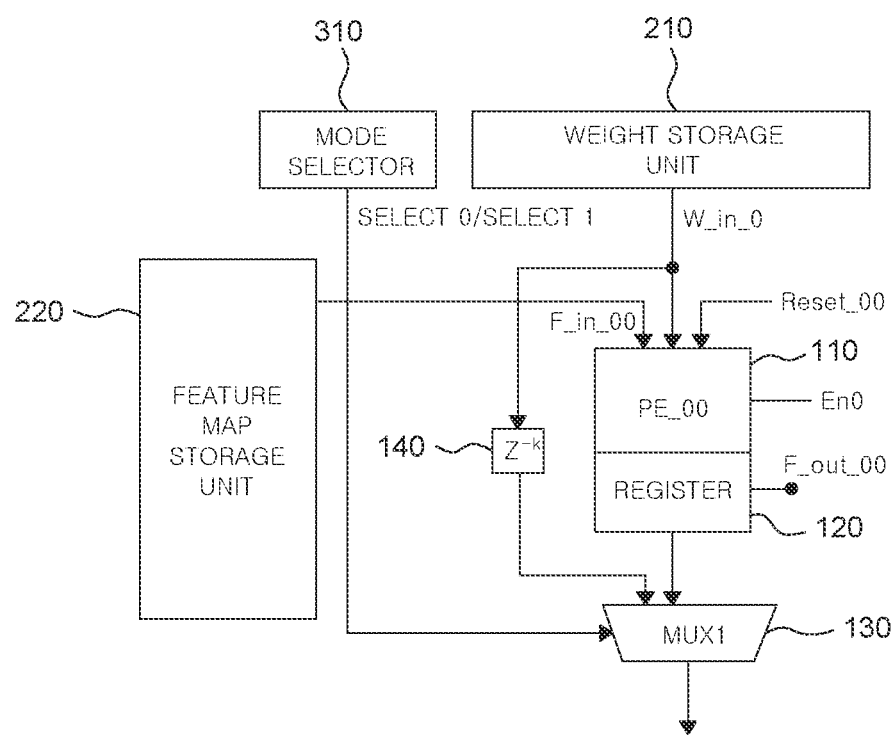
FIG. 6 is a configuration diagram illustrating one processing element of a processing element array according to an example of the present disclosure.

FIG. 6 illustrates an example configuration of one processing element of a processing element array according to an example of the present disclosure.

To specifically describe the operation of the processing element in the presented example, the elements described with reference to FIG. 4 (i.e., the weight storage unit 210, the feature map storage unit 220, and the mode selector 310) may be used.

Referring to FIG. 6, one of the plurality of processing elements 110 may be a PE_00, and the PE array 100 may include a register 120 corresponding to the PE_00. Each register 120 may be referred to as one of register files RF1, RF2, . . . as shown in FIG. 4. The register 120 may correspond to a temporary memory that stores the accumulated value of the accumulator 643 of FIG. 5.

The PE_00 may be connected to the weight storage unit 210 through a signal line W_in_0 configured to transmit the weight data, and may be connected to the feature map storage unit 220 through a signal line F_in_0 configured to transmit the feature map data.

The PE_00 of the plurality of processing elements 110 may perform an operation (i.e., MAC operation) on the weight data transmitted from the weight storage unit 210 and the feature map data transmitted from the feature map storage unit 220, and may store the operation value in the register 120. Here, the operation value may be feature map data indicating a result of MAC operation of weight data on the feature map data. For example, it may take nine clock cycles for the PE_00 to perform a convolution operation with a weight kernel of a 3×3 matrix. The accumulated value for nine clock cycles may be stored in the register 120. When the operation is completed in the PE_00, a reset signal Reset_00 for initializing the operation value may be received, and thus the operation value of the PE_00 may be initialized.

The PE_00 may be configured to reduce power consumption of the NPU 1000 by applying an enable signal En0 according to whether the PE_00 is activated. In addition, the utilization rate of the PE array 100 of the NPU 1000 may be determined according to whether each processing element is operated.

Whether each processing element is operated may be controlled by the controller 300. The controller 300 may be configured to generate an enable signal corresponding to each processing element.

The register 120 may refer to one of the register files 120 described above with reference to FIG. 4.

When an output command signal for outputting an operation value to the feature map storage unit 220 is received, the register 120 outputs an operation value through an output signal line F_out_00 connected to the feature map storage unit 220, and the output operation value may be stored in the feature map storage unit 220. Such a register 120 may be optionally provided.

When the register 120 is not provided, the operation value of the PE_00 may be directly transferred to and stored in the feature map storage unit 220.

The PE_00 may be connected to a signal line F_out_00 to which output data is transmitted when MAC operation is completed. The signal line F_out_00 may be connected to the internal memory 200 or may be configured to be connected to a separate vector processing unit or an activation function operation unit.

In more detail, the processing element according to examples of the present disclosure may be configured to transmit the received weight data to another processing element. Accordingly, since the transferred weight data can be reused within the processing element array. Therefore, the frequency of the weight data reloads from the internal memory 200, the on-chip memory 3000, and/or the main memory 4000 can be reduced.

In addition to the register 120, the PE array 100 may include a first multiplexer MUX1 of multiplexers (MUX1, MUX2, . . . ) 130 and a delay buffer (i.e., $Z^{-k}$) 140 corresponding to the PE_00.

According to the operation mode, the first multiplexer MUX1 may transmit either the weight data output from the delay buffer 140 or the weight data output from the PE_00 to the adjacent processing element.

Specifically, when the selection signal SELECT_0 for operating in the first mode is received from the mode selector 310, the first multiplexer MUX1 may operate in the first mode.

When the selection signal SELECT_1 for operating in the second mode is received from the mode selector 310, the first multiplexer MUX1 may operate in the second mode.

In the first mode, the first multiplexer MUX1 may transfer weight data output from the first processing element PE1 to an adjacent processing element. Here, the weight data may be transmitted to at least one processing element adjacent to the first processing element PE1, respectively. However, the term "adjacent processing element" is used only for convenience of description of the present disclosure, and an adjacent processing element may refer to "a corresponding processing element."

In the second mode, the first multiplexer MUX1 may transfer weight data output from the delay buffer 140 to an adjacent processing element. The weight data output from the delay buffer 140 may be weight data delayed by a preset number of clock cycles.

As such, the delayed weight data may be transmitted to at least one processing element connected to the PE_00, respectively. In various examples, the delayed weight data may be delayed and sequentially transmitted to at least one processing element corresponding to a column of processing elements connected to the first processing element PE1.

That is, a specific processing element may transmit an input weight to another adjacent processing element or to an adjacent delay buffer for each clock cycle. A multiplexer may be provided for this operation.

That is, the first multiplexer MUX1 may be configured to receive a weight output from a particular processing element and a weight output from the delay buffer 140.

That is, the first multiplexer MUX1 may be configured to receive weight data output from the delay buffer 140 and the processing element PE_00.

The delay buffer 140 temporarily stores the weight data W_in_0 transmitted from the weight storage unit 210 by a preset clock cycle and then outputs it. The weight data W_in_0 output from the delay buffer 140 is input to the first multiplexer MUX1. The weight data W_in_0 output from the delay buffer 140 may be weight data delayed by a preset number of clock cycles as described above. The delay buffer 140 may not operate in the first mode, but operates only in the second mode.

That is, the first multiplexer MUX1 may select the first input in the first mode and select the second input in the second mode.

When a convolution operation is performed, the feature map data and the kernel data (i.e., weight data) calculated with the feature map data may be in a matrix form.

According to the delay unit (i.e., a delay buffer) of the processing element array according to examples of the present disclosure, a plurality of processing elements corresponding to at least one column of processing elements of the processing element array may be configured to perform a depth-wise convolution operation using the delay buffers.

That is, when the convolution operation is performed in a specific processing element in a manner that the matrix-type kernel data slides on the matrix-type feature map data by a preset stride by utilizing the delay buffer 140, a portion of the kernel data may be reused for convolution operations of other adjacent processing elements.

The depth-wise convolution operation performance can be improved by reusing a portion of the reused kernel data by using the delay buffer 140 instead of repeatedly loading the kernel data from the weight storage unit 210 to the PE array 100.

Meanwhile, in the PE array 100, the processing elements operated in the second mode are activated by the enable signal En0, and the remaining processing elements that are not operated may be deactivated, thereby reducing power consumption of the NPU 1000.

Hereinafter, a PE array in which such processing elements are configured in a matrix form will be described with reference to FIG. 7.

Figure 7:
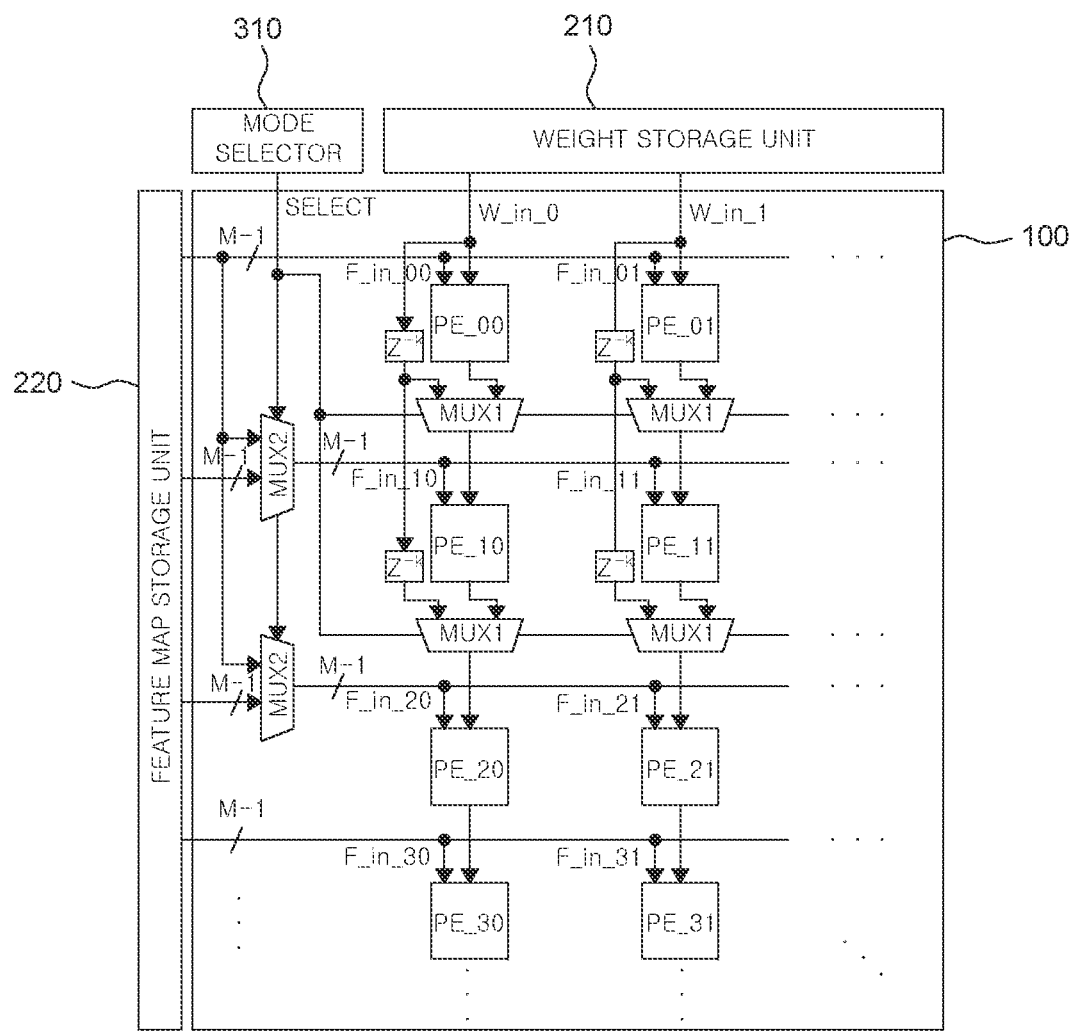
FIG. 7 is a schematic configuration diagram illustrating a structure of a processing element array according to an example of the present disclosure.

FIG. 7 illustrates a structure of a processing element array according to an example of the present disclosure. In the presented example, redundant descriptions of the operation of the processing element elements may be omitted.

Referring to FIG. 7, the PE array 100 may include a plurality of PEs including a plurality of PE rows and a plurality of PE columns.

Each of the PEs of the PE array 100 may be configured to receive a weight through W_in signal lines connected to the weight storage unit 210, and may be connected to F_in signal lines connected to the feature map storage unit 220.

The PE array 100 may operate in the first mode or the second mode according to the selection signals SELECT_0 and SELECT_1 of the mode selector 310.

When the selection signal SELECT_0 for operating in the first mode is received from the mode selector 310, the received selection signal is transmitted to the multiplexers MUX1 and MUX2 so that the multiplexers MUX1 and MUX2 operate in the first mode. Conversely, when the selection signal SELECT_1 for operating in the second mode is received from the mode selector 310, the received selection signal is transmitted to the multiplexers MUX1 and MUX2 so that the multiplexers MUX1 and MUX2 operate in the second mode.

Here, the first mode may mean an operation mode for a standard convolution operation or a point-wise convolution operation, and the second mode may mean an operation mode for a depth-wise convolution operation.

In the present disclosure, the multiplexer may also be referred to as a selector or a switch.

Each of the first multiplexers MUX1 may be respectively connected to output lines of weight data of at least k-stride number of PEs in a column direction, a vertical direction, or a first direction. The number of the first multiplexers MUX1 may be equal to the number of processing elements corresponding to (k-stride) PE rows. For example, one PE row may include M processing elements. However, the present disclosure is not limited thereto.

The second multiplexers MUX2 may be connected to input lines of feature map data for at least (k-stride) PE rows in a row direction (i.e., a horizontal direction, or a second direction). The number of the second multiplexers MUX2 may be at least (k-stride). However, the present disclosure is not limited thereto.

Here, "k" may be the size of the weight kernel. For example, if the size of the kernel is 3×3, k is equal to three.

Here, the stride means the stride value of the convolution. The stride may be, for example, an integer value greater than or equal to one. For example, if k is "3" and stride is "1," each of the first multiplexers MUX1 may be connected to weight data output lines of at least two PE rows, respectively, and each of the second multiplexers MUX2 may be connected to input lines of feature map data of at least two PE rows, respectively. Here, the input line of the feature map data may be a signal bus line composed of M channels. Here, "M" may refer to the number of processing elements arranged in one PE row. However, the present disclosure is not limited thereto.

In other words, a first multiplexer MUX1 may be connected to an output line of weight data of a processing element and an output line of weight data of the corresponding delay buffer $Z^{-k}$ with respect to at least (k-stride) PE rows.

In other words, a second multiplexer MUX2 may be connected to an input line of the feature map storage unit 220 output feature map data with respect to at least (k-stride) PE rows. The number of multiplexers MUX1 and MUX2 may be determined with reference to the size of the kernel of the artificial neural network model to be processed, but is not limited thereto. The number of multiplexers MUX1 and MUX2 may be determined with reference to the size of the kernel of the ANN model to be processed, but is not limited thereto.

In more detail, a first PE row may refer to a first plurality of processing elements (PE_00, PE_01, . . . ), and a second PE row may refer to a second plurality of processing elements (PE_10, PE_11, . . . ).

In more detail, a first PE column may refer to a third plurality of processing elements (PE_00, PE_10, PE_20, PE_30, . . . ) and a second PE column may refer to a fourth plurality of processing elements (PE_01, PE_11, PE_21, PE_31, . . . ).

Hereinafter, the PE array 100 according to an example of the present disclosure will be described with the first mode as an example.

In the first mode, weight data output from the weight storage unit 210 is input to each of the plurality of PE columns through each W_in signal line. For example, the first weight data is input to the PEs of the first PE column (PE_00, PE_10, PE_20, PE_30, . . . ) corresponding to the W_in_0 signal line. In this case, the first weight data input to the first processing element PE_00 is output from the first processing element PE_00 and input to the first multiplexer MUX1 corresponding to the first processing element PE_00. In the first mode, the first multiplexer MUX1 transmits the weight data output from the first processing element PE_00 to the second processing element PE_10 of the next adjacent row at the next clock cycle.

Then, the weight data input to the second processing element PE_10 is output from the second processing element PE_10 at the next clock cycle and is input to another first multiplexer MUX1 connected to the output signal line of the second processing element PE_10. In the first mode, the first multiplexer MUX1 also transfers the weight data output from the second processing element PE_10 to the third processing element PE_20 of the next adjacent row in the same column.

Then, the weight data input to the third processing element PE_20 is output from the third processing element PE_20 and is input to the fourth processing element PE_30 of the next adjacent column. This operation may continue up to the last processing element of the matrix.

For example, one of weight data may be sequentially transmitted along the PEs of the first PE column connected by the W_in_0 signal line.

That is, a PE column of the PE array 100 according to examples of the present disclosure may be configured to have a pipeline structure configured to transmit weight data to an adjacent PE.

The same operation as described above may be also performed on the second PE column corresponding to the W_in_1 signal line, and the same operation may be performed on a plurality of PE columns of the PE array 100.

In the first mode, the feature map data output from the feature map storage unit 220 may be input to each of the plurality of PE rows through each F_in signal line. For example, the feature map data may be unicast or broadcast to PE rows such as F_in_00 signal line, F_in_10 signal line, F_in_20 signal line, F_in_30 signal line and so on. This operation may continue until the last processing element of the matrix.

The F_in signal line may be a bus line including M channels. The F_in signal line may be a bus line including individual signal lines corresponding to one PE row. For example, if the PEs of the first PE row (PE_00, PE_01, . . . ) is configured to have 64 processing elements, the F_in_00 signal line may be a bus line configured with a group of 64 individual lines. Further, the F_in signal line may be configured to unicast individual feature map data or broadcast the same feature map data to each processing element in a PE row.

As such, when feature map data and weight data are input to each PE, a MAC operation on the feature map data and weight data input from each PE is performed every clock cycle and the operation result data (i.e., feature map data) calculated through the operation may be output from each PE and stored in the feature map storage unit 220.

In more detail, not shown in FIG. 7, but referring to FIG. 6, each PE may be configured to include an F_out signal line outputting a MAC operation value from a register in which a MAC operation value is stored. However, the present disclosure is not limited thereto, and the F_out signal line may be configured to be connected to the internal memory 200 or another additional operation unit.

Hereinafter, the PE array 100 according to an example of the present disclosure will be described with the second mode as an example.

When the selection signal SELECT_1 for operation in the second mode is output from the mode selector 310, the selection signal is transmitted to the multiplexers MUX1 and MUX2 so that the PE array 100 operates in the second mode. Here, the second mode may refer to an operation mode for the depth-wise convolution operation.

In the second mode, weight data output from the weight storage unit 210 is input to each of the plurality of PE columns through W_in signal lines, respectively. In this case, delay buffers $Z^{-k}$ provided in some PE rows of a plurality of PE columns (i.e., k-stride PE rows) may be utilized to reuse weight data.

Each of the W_in signal lines connected to the weight storage unit 210 may have a branch, and through this branch, the PE of the PE column corresponding to each W_in signal line and the delay buffer $Z^{-k}$ may be connected. The delay buffer $Z^{-k}$ outputs weight data delayed by k clock cycles. That is, a plurality of delay buffers $Z^{-k}$ may be cascaded to increase, by the amount of cascading, the number of clock cycles to be delayed.

For example, in the second mode, when the weight data is input to the first processing element PE_00 through the W_in_0 signal line connected to the weight storage unit 210, the corresponding weight data is also transferred to the delay buffer $Z^{-k}$ corresponding to the first processing element PE_00 through the branch. The weight data transferred to the delay buffer $Z^{-k}$ is delayed by k clock cycles and transferred to the first multiplexer MUX1 corresponding to the first processing element PE_00. The delayed weight data is transmitted to the second processing element PE_10 of the next row through the first multiplexer MUX1 corresponding to the first processing element PE_00. In addition, the delayed weight data output through the delay buffer $Z^{-k}$ is input to the next delay buffer $Z^{-k}$ corresponding to the second processing element PE_10 of the next row.

The delayed weight data transferred to the delay buffer $Z^{-k}$ corresponding to the second processing element PE_10 is delayed by k clock cycles and is transmitted to the first multiplexer MUX1 corresponding to the second processing element PE_10. Such delayed weight data is input to the third processing element PE_20 of the next adjacent row through the first multiplexer MUX1 corresponding to the second processing element PE_10. This operation may continue up to (k-stride) processing elements for each PE column of the PE array 100.

As such, since the structure in which the delay buffers $Z^{-k}$ are provided corresponding to (k-stride) PE rows is a cascaded structure, an extended design of the processing element array is possible.

In the second mode, the feature map data stored in the feature map storage unit 220 is broadcast to a plurality of PE rows through an F_in signal line having k number of branches. For example, the F_in signal line having k branches may be connected to the PEs of each of the first, second, and third PE rows.

In the second mode, the F_in signal line may have k branches, and may be connected to (k-stride) input lines of PE rows corresponding to the F_in signal line through the branches.

In the second mode, the feature map data input through k branches is transferred to the PEs of the first PE row and to the second multiplexer MUX2 connected to the PEs of each of the second and third PE rows. Accordingly, the feature map data is broadcast to the PEs of each the first, second, and third PE rows.

As such, when feature map data (i.e., input feature map data) and weight data are input to each PE, MAC operation is performed on the input feature map data and weight data in each PE. The operation result data (i.e., output feature map data) calculated through the operation may be output from each PE and stored in the internal memory 200 or the feature map storage unit 220.

A number (k) of PE rows operating in the second mode may be activated through an enable En signal, and the remaining non-operated PE rows may be deactivated for power saving of the NPU 1000.

In the second mode, as the feature map data is broadcast to specific PE rows, the feature map signal is changed in comparison to the first mode. Accordingly, the second mode will be described in detail later with reference to FIG. 8.

Hereinafter, the operation of the PE array in the first mode will be described in detail with reference to FIG. 8.

Figure 8:
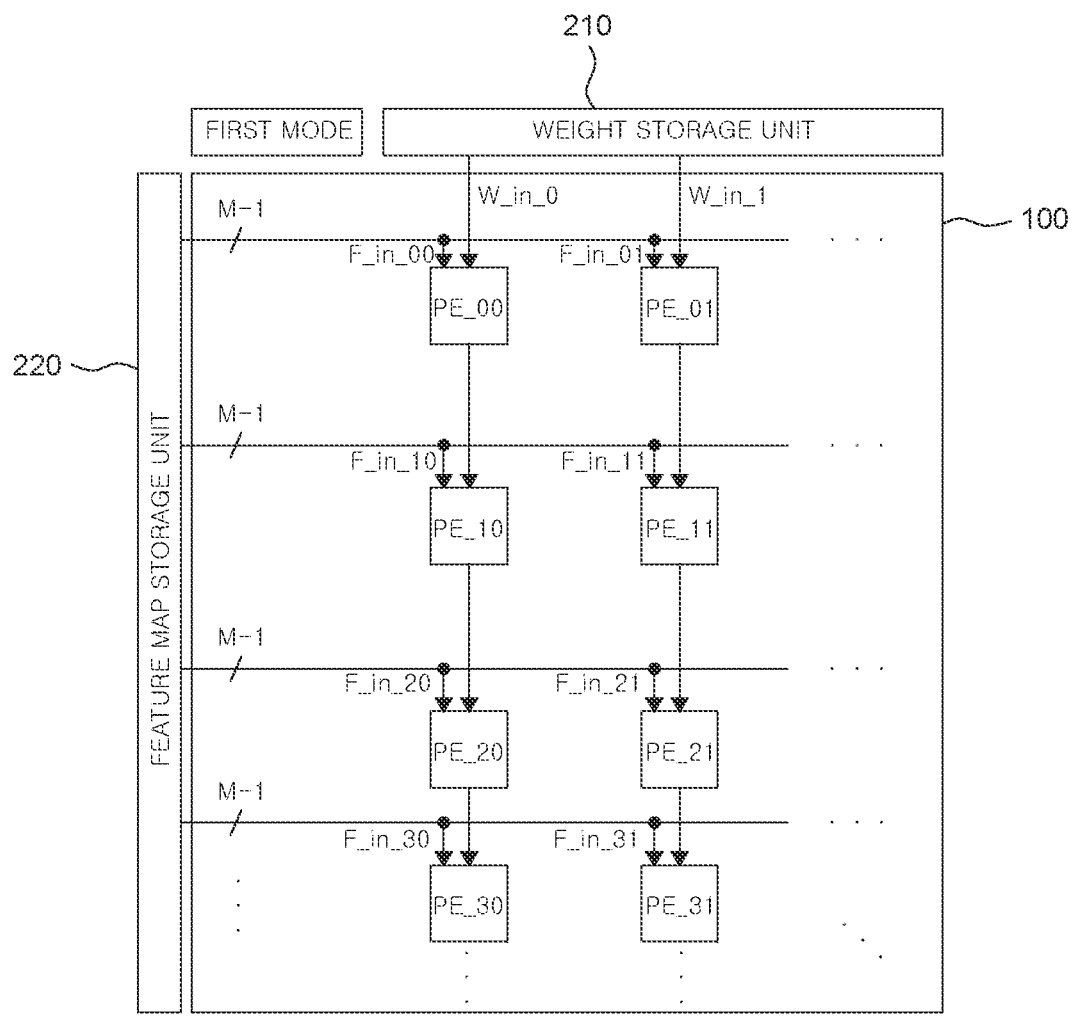
FIG. 8 is a schematic diagram illustrating a structure of a processing element array operating in a first mode according to an example of the present disclosure.

FIG. 8 illustrates a structure of a processing element array operating in a first mode according to an example of the present disclosure.

For convenience of description, elements that do not substantially operate in the first mode among the elements shown in FIG. 7 may be omitted in FIG. 8.

In the presented example, the PE array is described as comprising N×M processing elements (PEs). Here, N and M may be integers, and N and M may be the same number.

Referring to FIG. 8, in the first mode, the PE array 100 may be configured in an output stationary systolic array method, but is not limited thereto.

In the first mode, the weight data output from the weight storage unit 210 is transmitted to each PE configuring the PE array 100 through the W_in signal lines (W_in_0, W_in_1, ... W_in_M) connected to the output of the weight storage unit 210. For example, a W_in_0 signal line connected along a first PE column among the plurality of PE columns may be pipelined, and thus the weight data can be cascaded along a PE column (PE_00, PE_10, PE_20, PE_30, ... PE_N0) and a W_in_1 signal line connected along a second PE column among the plurality of PE columns may be pipelined, and thus the weight data can be cascaded along a PE column (PE_01, PE_11, PE_21, PE_31 ... PE_N1).

In the first mode, the feature map data output from the feature map storage unit 220 is transmitted to each PE configuring the PE array 100 through the F_in signal lines (F_in_00, F_in_01, ... F_in_NM) connected to the output of the feature map storage unit 220. For example, the feature map data may be supplied to a first PE row (PE_00, PE_01, ..., PE_0M) through the signal lines (F_in_00, F_in_01, ..., F_in_0M) connected to the first PE row among the plurality of PE rows and may be supplied to a second PE row (PE_10, PE_11, ..., PE_1M) through the signal lines (F_in_10, F_in_11, ..., F_in_1M) connected to the second PE row among the plurality of PE rows.

Further, the feature map data may be supplied to a third PE row (PE_20, PE_21, ..., PE_2M) through the signal lines (F_in_20, F_in_21, ..., F_in_2M) connected to the third PE row among the plurality of PE rows and may be supplied to a fourth PE row (PE_30, PE_31, ..., PE_3M) through the signal lines (F_in_30, F_in_31, ..., F_in_3M) connected to the fourth PE row among the plurality of PE rows.

When the weight data and the feature map data are input in such way, each PE performs a MAC operation on the weight data and the feature map data, and transmits the operation result to the feature map storage unit 220.

Accordingly, PE array 100 may be connected to the weight storage unit 210 through the W_in signal line (W_in_0, W_in_1, ..., W_in_M) and may be connected to feature map storage unit 220 through the F_in signal line (F_in_00, F_in_01, ..., F_in_NM).

Further, the signal lines (F_in_00, F_in_01, ..., F_in_0M) may be a signal bus line including M-1 signal lines.

Each signal line may be coupled to a respective PE of the PE array 100. Accordingly, the feature map data transmitted through respective F_in signal lines may be performed through unicast communication, which is point-to-point communication.

Meanwhile, one signal line may be used for the signal line to which W_in_0 is input. A corresponding signal line may be connected to each PE of the PE array 100 in a column direction. Accordingly, the weight data transmitted to a PE (e.g., PE_00) through the W_in_0 signal line may be shifted, i.e., transferred to another PE (e.g., PE_10) of the next row for each clock. Through this, the weight data is reused in the PE array 100 to minimize resource consumption and memory usage used for the operation.

Hereinafter, the operation of the processing element array in the second mode will be described in detail with reference to FIG. 9.

Figure 9:
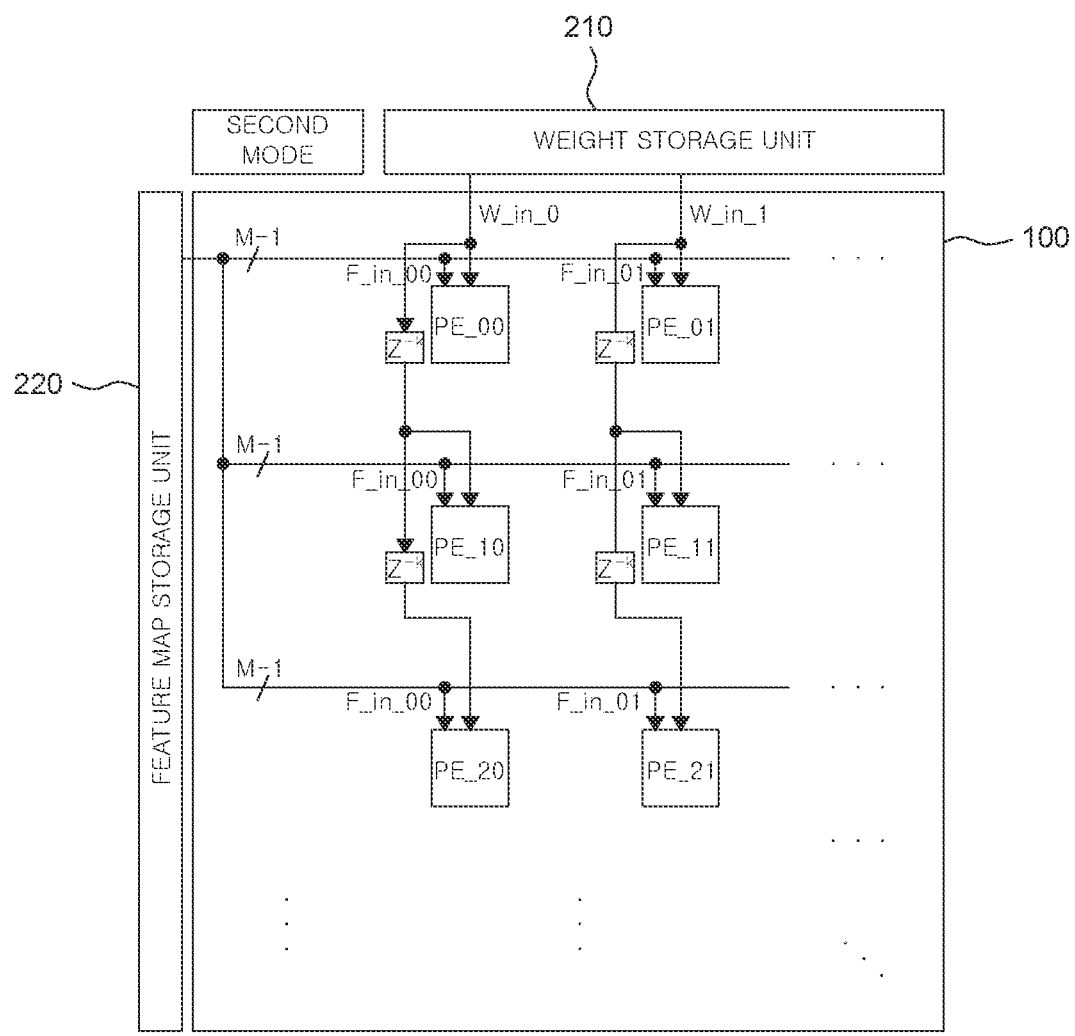
FIG. 9 is a schematic diagram illustrating a structure of a processing element array operating in a second mode according to an example of the present disclosure.

FIG. 9 illustrates a structure of a processing element array operating in a second mode according to an example of the present disclosure.\

For convenience of description, elements that do not substantially operate in the second mode among the elements shown in FIG. 7 may be omitted in FIG. 9.

In the presented example, the PE array 100 is described as comprising N×M PEs. Here, N and M may be integers, and N and M may be the same number.

In the second mode, for example, if the size of the kernel is 3×3, the feature map data output from the feature map storage unit 220 is broadcast to k PE rows through signal lines (F_in_00, F_in_01, ..., F_in_0M) connected to k branches corresponding to F_in signal lines.

For example, in the second mode, the F_in_00 signal is broadcast to the first PE column (PE_00, PE_10, PE_20) connected to k branches.

For example, in the second mode, the F_in_01 signal is broadcast to the second PE column (PE_01, PE_11, PE_21) connected to k branches.

In the second mode, weight data output from the weight storage unit 210 is transmitted to each PE of the PE array 100 through W_in signal lines (W_in_0, W_in_1, ..., W_in_M) connected to the output of the weight storage unit 210. Corresponding weight data may be transmitted to the delay buffer $Z^{-k}$ corresponding to each PE, and may be transmitted to the next PE of each row connected to the delay buffer $Z^{-k}$.

For example, the weight data is transmitted to PE_00 through the W_in_0 signal line connected to the first PE column among the plurality of PE columns, the corresponding weight data is MAC-operated in PE_00, and the weight data transferred to the delay buffer $Z^{-k}$ through a branch corresponding to PE_00 may be delayed by k clock cycles. This delayed weight data is transferred to PE_10 of the next adjacent PE along column direction.

Subsequently, the delayed weight data may be MAC-operated in PE_10, transferred to the delay buffer $Z^{-k}$ through a branch corresponding to PE_10, and delayed by k clock cycles again. That is, weight data delayed by 2k clock cycles is transferred from PE_00 to PE_20.

The delayed weight data is MAC-operated in PE_20. Such an operation may be performed for a PE column corresponding to each of the signal lines.

In this way, the weight data transmitted with delay through the delay buffer $Z^{-k}$ can be delayed broadcast in the direction of each PE column. Accordingly, the weight data transmitted from the weight storage unit 210 may be reused in each PE by delayed broadcast technique that the weight data delayed.

In the second mode, the feature map data output from the feature map storage unit 220 is broadcast to predetermined PE rows of the PE array 100 through F_in signal lines (F_in_00, F_in_01, . . . , F_in_0M) having predetermined branches connected to the output of the feature map storage unit 220.

In the second mode, the feature map data input through k branches is transferred to the first PE row (PE_00, PE_01, . . . , PE_0M), the second PE row (PE_10, PE_11, . . . , PE_1M), and the third PE row (PE_20, PE_21, . . . , PE_2M). Accordingly, the feature map data is broadcast to the first PE rows (PE_00, PE_01, . . . ), the second PE rows (PE_10, PE_11, . . . ), and the third PE rows (PE_20, PE_21, . . . ). As such, when feature map data (i.e., input feature map data) and weight data are input to each PE, MAC operations on the feature map data and weight data input to each PE are performed for each clock. The operation result data (i.e., output feature map data) calculated through the operation may be output from each PE and stored in the internal memory 200 or the feature map storage unit 220.

That is, each PE receives the weight data and the feature map data and performs MAC operations on the weight data and the feature map data.

That is, a PE array may be configured to include a PE_00 to receive a weight data, a delay buffer $Z^{-k}$ configured to receive and delay the received weight data for a specific number of clock cycles so as to output to PE_10, and a broadcast signal line F_in_00 configured to simultaneously provide feature map data to PE_00 and PE_10. Accordingly, the delay unit may be configured to process depth-wise convolution while reusing the weight data.

In other words, depth-wise convolution that can reuse data can be implemented by providing one delay buffer that transmits a weight, two processing elements corresponding to inputs and outputs of the delay buffer, and a signal line for simultaneously inputting feature map data to the two processing elements.

In addition, when the size of the weight kernel of the ANN model is 3×3, depth-wise convolution that can reuse data can be implemented by providing two delay buffers that transmit weights, three processing elements corresponding to inputs and outputs of the two delay buffers, and a signal line for simultaneously inputting a feature map to the three processing elements.

If the weight kernel of the ANN model is 3×3, the first PE column (PE_00, PE_10, PE_20) may process the first depth-wise convolution while delaying the first weight kernel. Also, the second PE column (PE_01, PE_11, PE_21) may process the second depth-wise convolution while delaying the second weight kernel.

That is, two delay buffers, three processing elements, and a broadcast signal line including three branches may be regarded as a unit capable of processing depth-wise convolution of a 3×3 kernel. Accordingly, if the number of said units is increased, the number of depth-wise convolutions that can be simultaneously processed may also increase proportionally.

In this way, if delayed broadcast is implemented by a delay buffer when the PE array 100 transmits weight data to each PE, energy consumed in the NPU can be reduced, and efficiency of the PE array and the throughput of the NPU can be improved in the second mode operation. In addition, the PE array 100 may minimize power consumption by inactivating elements that do not operate in the second mode.

That is, comparing FIG. 8 and FIG. 9, the first mode is configured such that each of the F_in signal lines operates individually for each PE, and the second mode is configured such that at least some of the PEs in each PE column are connected by branches of the F_in signal line, so that some PEs in each PE column are configured to be broadcast.

Hereinafter, a PE array for operating in a low power mode by grouping PEs so as to activate or deactivate each PE operating in the first mode or the second mode will be described with reference to FIG. 10.

Figure 10:
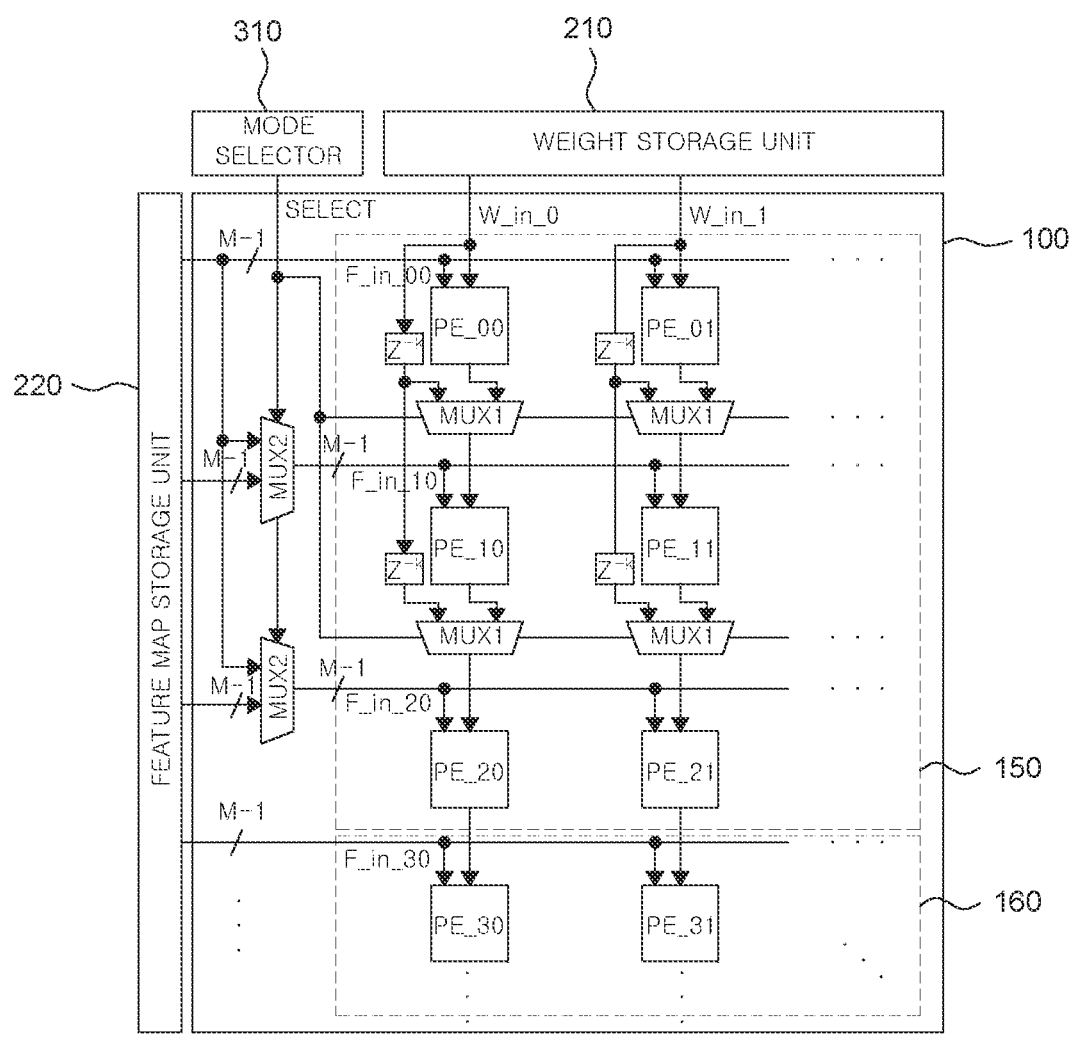
FIG. 10 is a schematic configuration diagram illustrating a structure of a processing element array according to an example of the present disclosure.

FIG. 10 is a schematic configuration diagram illustrating a structure of a processing element array according to an example of the present disclosure.

Referring to FIG. 10, the PE array 100 may identify PEs operating according to the first mode and the second mode. That is, a plurality of PEs operating according to the first mode may be grouped, and a plurality of PEs operating according to the second mode may be grouped.

Referring to FIG. 7, PEs corresponding to the first group 150 and the second group 160 may operate in the first mode, and PEs corresponding to the first group 150 may operate only in the second mode.

When a selection signal for operating in the first mode is received from the mode selector 310, the PE array 100 transmits an enable signal to each PE of the first group 150 and the second group 160 to activate the PEs of the first group 150 and the second group 160. Accordingly, the PEs of the first group 150 and the second group 160 may be activated to perform the operation of the first mode.

When a selection signal for operating in the second mode is received from the mode selector 310, the PE array 100 transmits an enable signal to each PE of the first group 150 to activate the PEs of the first group 150 operating in the second mode. Accordingly, the PEs of the first group 150 may be activated to perform the operation of the second mode, and the second group 160 may be deactivated. As such, the PE that is not used in the second mode can be deactivated, so that the low-power mode operation of the PE array 100 may be implemented.

In various examples, the PE array 100 may be configured to include a plurality of first groups 150. Accordingly, the utilization rate of the PE array 100 may be increased during the depth-wise convolution operation of the PE array 100.

In various examples, the PE array 100 may individually drive a corresponding PE by applying an enable signal according to each layer of the ANN model. The PE array 100 analyzes the layer structure of the ANN model and individually activates (turn-on) or deactivates (turn-off) the PE corresponding to each layer of the ANN model, thereby minimizing the power consumption of the NPU.

Hereinafter, a processing element array having a delay buffer of various structures will be described with reference to FIG. 11.

Figure 11:
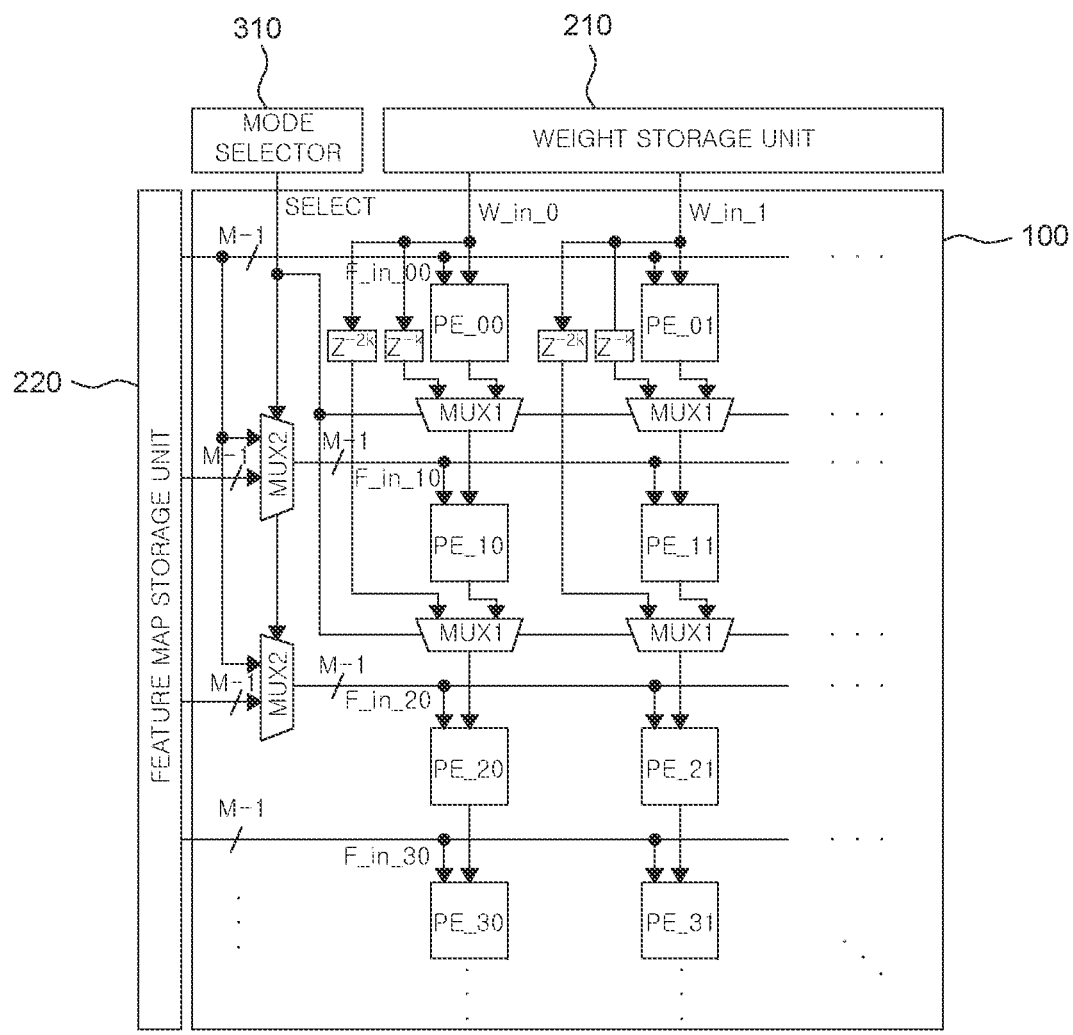
FIG. 11 is a schematic configuration diagram illustrating a structure of a processing element array according to an example of the present disclosure.

FIG. 11 illustrates a structure of a processing element array according to an example of the present disclosure. In the presented example, descriptions of the redundant elements as those described above may be omitted for convenience of description.

Referring to FIG. 11, k-stride PEs in the PE array 100 are connected to two delay buffers (e.g., a first delay buffer $Z^{-k}$ and a second delay buffer $Z^{-2k}$), respectively. Specifically, the first delay buffer $Z^{-k}$ connected to each PE of the second PE row (PE_10, PE_11, . . . , PE_1M) in the PE array 100 may output weight data delayed by k clock cycles. Further, the second delay buffer $Z^{-2k}$ connected to each PE of the third PE row (PE_20, PE_21, . . . , PE_2M) in the PE array 100 may output weight data delayed by 2k clock cycles.

When the selection signal SELECT_1 for operating in the second mode is received from the mode selector 310, the weight data transmitted from the weight storage unit 210 may be transmitted to PEs in k PE rows through W_in signal lines connected to the weight storage unit 210. For example, weight data is transmitted to PE_00 through the W_in_0 signal line, and the corresponding weight data is transmitted to the first delay buffer $Z^{-k}$ through a branch corresponding to PE_00. The weight data transferred to the first delay buffer $Z^{-k}$ is delayed by k clock cycles and transferred to the first multiplexer MUX1 corresponding to the output line of PE_00. The weight data delayed by k clock cycles is transmitted to the adjacent PE_10 through the first multiplexer MUX1 corresponding to the output line of PE_00. In addition, the corresponding weight data is also transferred to the second delay buffer $Z^{-2k}$ through a branch corresponding to PE_00 and the weight data transferred to the second delay buffer $Z^{-2k}$ is delayed by 2k clock cycles and transferred to the first multiplexer MUX1 corresponding to the output line of PE_10. The weight data delayed by 2k clock cycles is transmitted to the adjacent PE_20 through the first multiplexer MUX1 corresponding to the output line of PE_10.

As such, the structure in which two delay buffers $Z^{-k}$ and $Z^{-2k}$ are provided corresponding to each PE of the (k-stride) PE rows enables a custom design of a PE array for calculating an ANN model with a small kernel size.

In more detail, the PE array 100 may be configured to differently set the number of delay clock cycles of a delay buffer suitable for a specific processing element to implement the second mode.

In detail, the PE array 100 illustrated in FIG. 7 and the PE array 100 illustrated in FIG. 11 are configured to operate in substantially the same second mode.

Hereinafter, a structure of a PE array for individually activating/deactivating the second multiplexer MUX2 connected to input lines of feature map data for a plurality of PE rows will be described with reference to FIG. 12.

Figure 12:
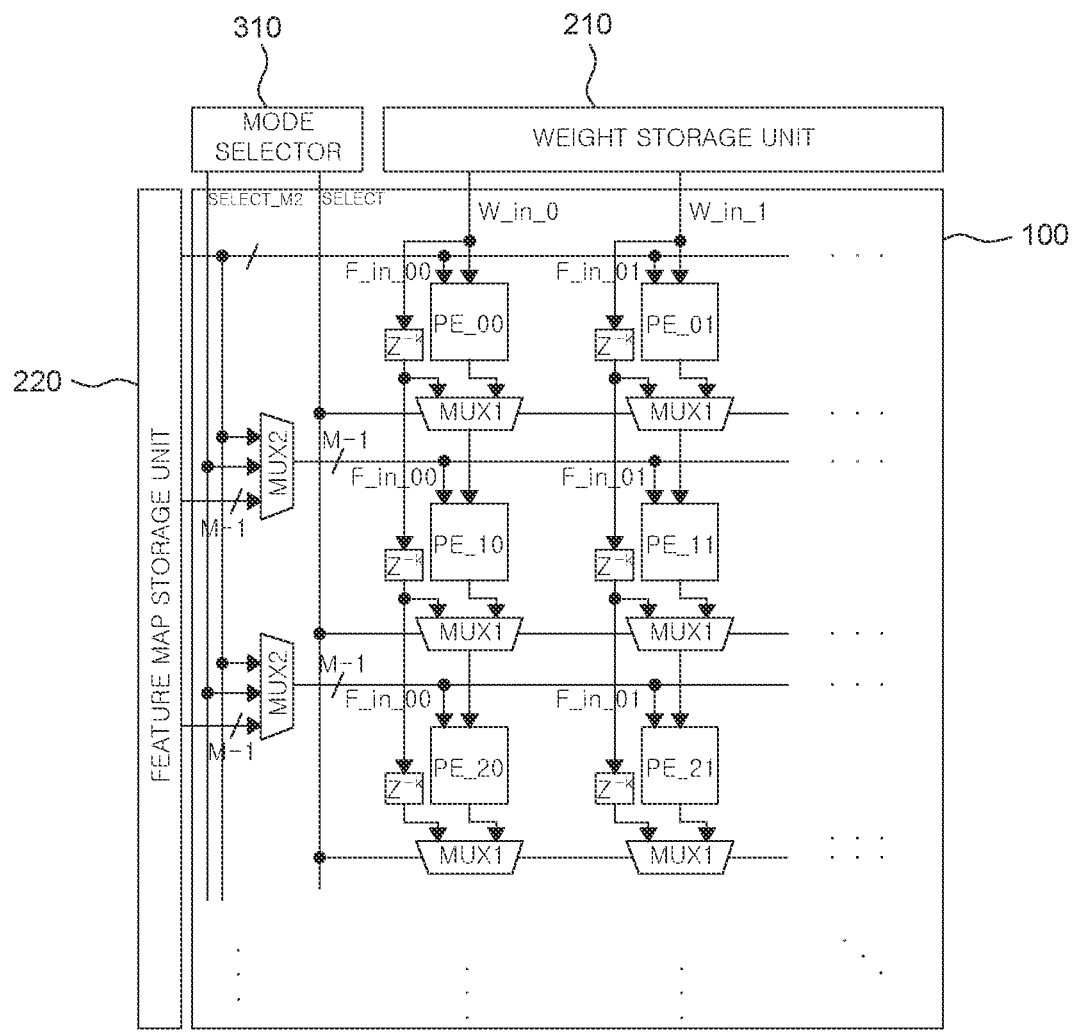
FIG. 12 is a schematic diagram illustrating a structure of an array of processing elements according to an example of the present disclosure.

FIG. 12 illustrates a structure of an array of processing elements according to an example of the present disclosure.

Referring to FIG. 12, at least one second multiplexer MUX2 connected to the feature map storage unit 220 may be connected to at least one PE row. Each of the second multiplexers MUX2 may be individually activated or deactivated by the MUX2 selection signal SELECT_M2 transmitted from the mode selector 310. That is, the MUX2 selection signal SELECT_M2 may be configured as an on/off signal for controlling the second multiplexer MUX2, respectively.

The MUX2 selection signal SELECT_M2 transmitted from the mode selection unit 310 is connected to each of the second multiplexers MUX2. The number of signal lines (i.e., a bus line) of the mode selector 310 corresponding to the MUX2 selection signal SELECT_M2 may be corresponding to the number of the second multiplexers MUX2.

Each of the second multiplexers MUX2 may be individually activated or deactivated by the MUX2 selection signal SELECT_M2. For example, the number of signal lines to which the MUX2 selection signal SELECT_M2 is transmitted may be as many as the number of the second multiplexes MUX2.

When the mode selection signal SELECT controls the first multiplexer MUX1, the first multiplexer MUX1 may control corresponding processing elements to operate in a first mode (i.e., standard convolution) or a second mode (i.e., depth-wise convolution).

However, in the example as presented in FIG. 12, each PE row is configured to be selectively controlled by the MUX2 selection signal SELECT_M2.

Accordingly, the plurality of PE rows may be configured to simultaneously receive feature map data in a broadcast manner according to the MUX2 selection signal SELECT_M2.

Among them, a specific PE row may be configured to receive feature map data in a unicast manner according to the MUX2 selection signal SELECT_M2.

Also, specific PE rows may be activated or deactivated by the enable signal En0 shown in FIG. 6. For example, when the second PE row (PE_10, PE_11, . . . ) is inactivated by the enable signal En0, the weight delayed by the delay buffer $Z^{-k}$ may be transmitted to the third PE row. Accordingly, it is possible to implement or modify the convolution operation in various ways in the PE array 100.

In addition, in some embodiments, it is also possible to set the delay clock of the delay buffer $Z^{-k}$ individually for each PE row.

As such, since the second multiplexer MUX2 connected to the output of the feature map storage unit 220 is individually activated or deactivated by the MUX2 selection signal SELECT_M2, even if the kernel size of the ANN model is changed and the kernel size of each layer of the ANN model is different, the PE array 100 is capable of performing the operation with ease.

Hereinafter, the operation of the processing element array performing the depth-wise convolution operation in the second mode will be described in detail with reference to FIGS. 13 to 16.

Figure 13:
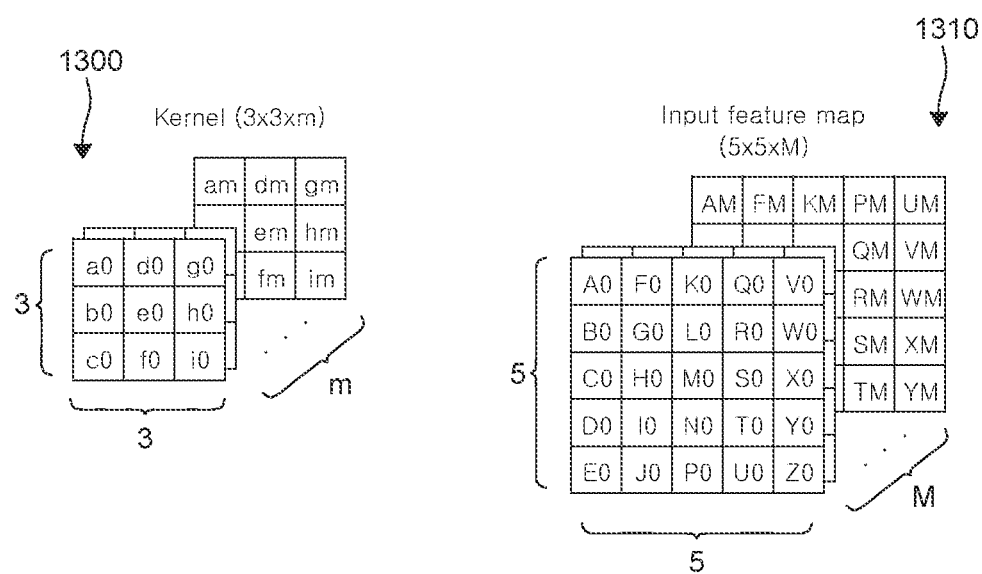
FIG. 13 is an exemplary diagram for explaining weight data and feature map data according to an example of the present disclosure.
Figure 14:
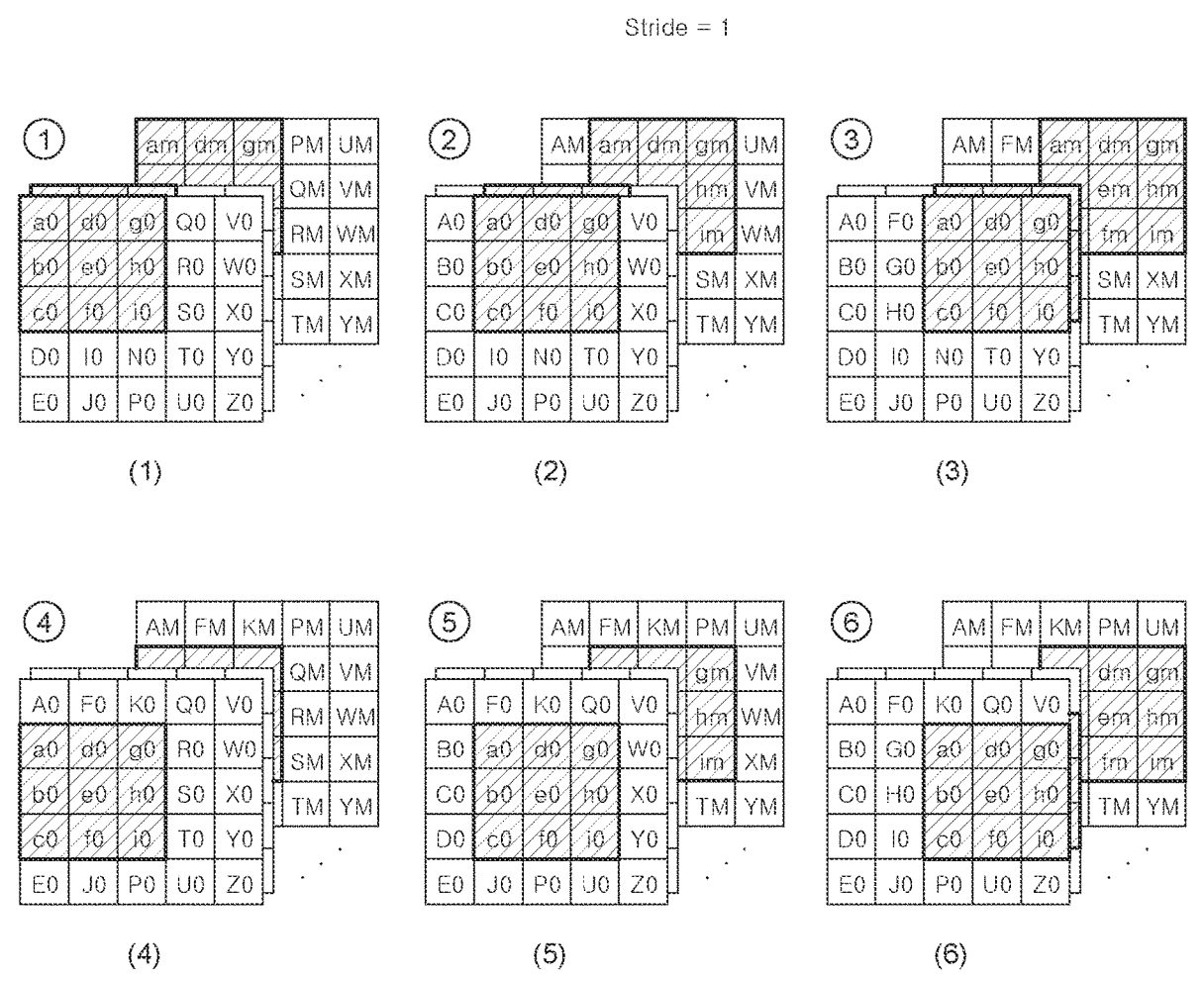
Figure 15:
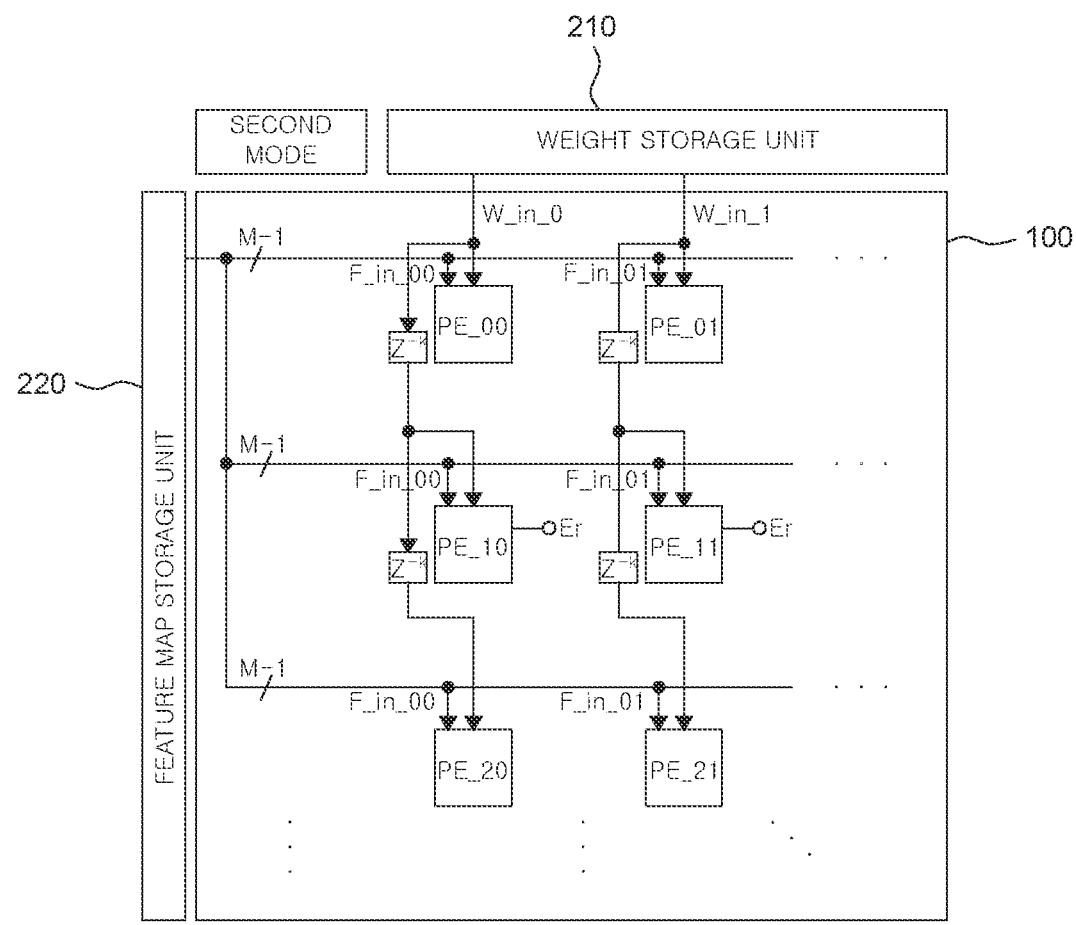
FIG. 15 is a schematic diagram illustrating a structure of a processing element array according to an example of the present disclosure.
Figure 16:
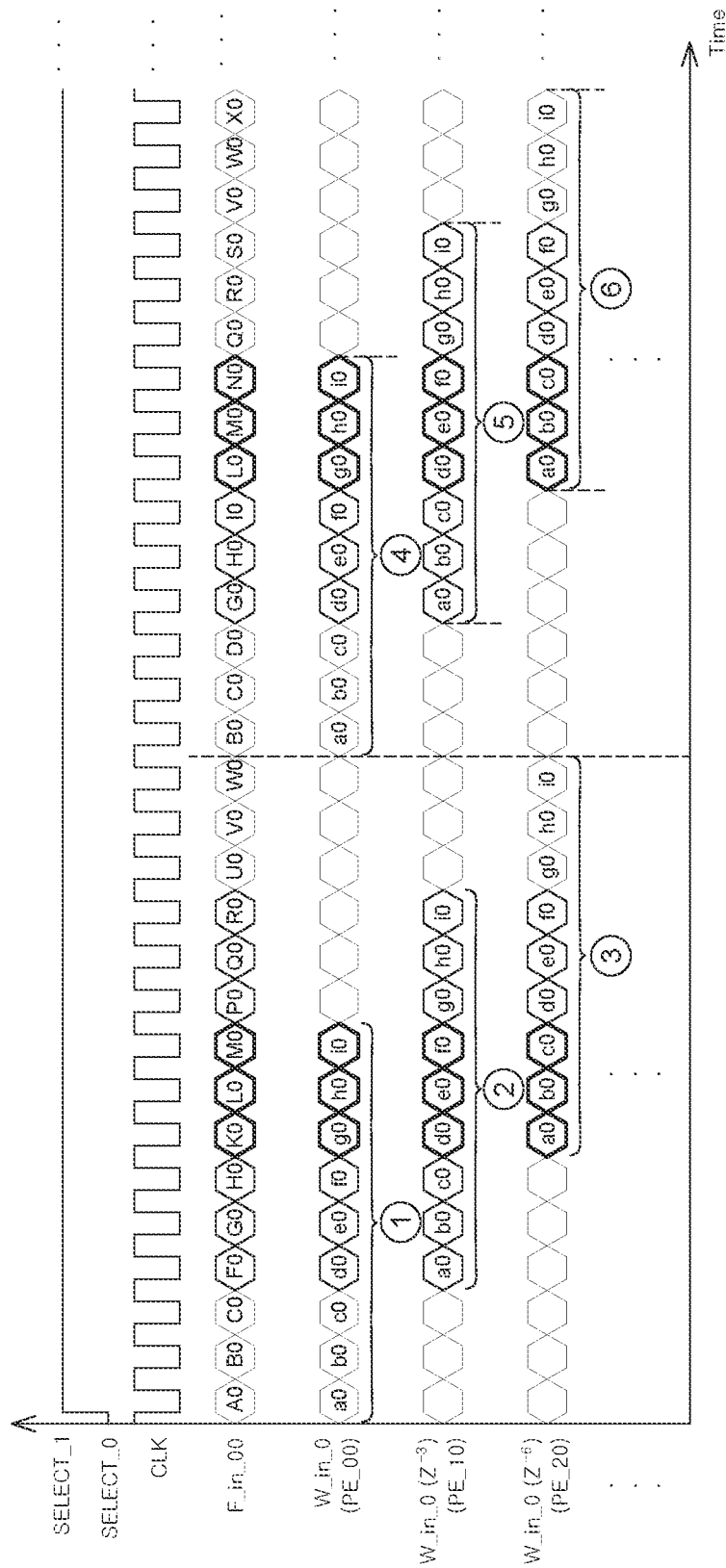
FIG. 16 is an exemplary diagram for explaining weight data stored over time in a delay buffer according to an example of the present disclosure.

FIG. 13 is for explaining weight data and feature map data according to an example of the present disclosure. FIG. 14 is for explaining a depth-wise convolution operation on weight data and feature map data according to an example of the present disclosure. FIG. 15 illustrates a structure of a processing element array according to an example of the present disclosure. FIG. 16 is for explaining weight data stored over time in a delay buffer according to an example of the present disclosure.

First, referring to FIG. 13, it is assumed that a depth-wise convolution operation is performed on the kernel data 1300 in the form of a 3×3×m matrix and the input feature map data 1310 in the form of a 5×5×M matrix. It is assumed that the stride between the kernel data 1300 and the input feature map data 1310 for the convolution operation is "1."

In this case, the convolution operation is performed by sliding the kernel data 1300 of size 3×3×m over the input feature map data 1310 of size 5×5×M by 1 stride, such that each value of the kernel data 1300 is multiplied by each value of the input feature map data 1310 that overlaps, and all of the multiplied values are added.

Specifically, each step will be described with reference to FIGS. 14 to 16.

In step (1), the first kernel (i.e., a0, b0, c0, d0, e0, f0, g0, h0, i0) of the kernel data 1300 having a size of 3×3×m as illustrated in FIG. 14 slides at stride of 1 and is calculated with the overlapping first feature map portion (i.e., A0, B0, C0, F0, G0, H0, K0, L0, M0) among elements of the input feature map data 1310.

At this time, step (1) is sequentially processed for nine clock cycles in PE_00 of FIG. 15. That is, for the convolution operation of the first kernel and the first feature map portion, PE_00 requires nine clock cycles for the operation.

At this time, in step (1), the signal W_in_0 of PE_00, which is the signal of the first kernel as illustrated in FIG. 16, and the signal F_in_00 (A0, B0, C0, F0, G0, H0, K0, L0, M0), which is the signal for the first feature map portion, are input to PE_00 of FIG. 15 for nine clock cycles. That is, each element of the first kernel (a0, b0, c0, d0, e0, f0, g0, h0, i0) and each element of the first feature map portion (A0, B0, C0, F0, G0, H0, K0, L0, M0) are sequentially input to PE_00.

As shown in FIG. 16, a MAC operation of step (1) is performed on the elements (A0, B0, C0, F0, G0, H0, K0, L0, M0) of the feature map data 1310 input to the PE with the elements (a0, b0, c0, d0, e0, f0, g0, h0, i0) of the input kernel data 1300, respectively. This operation may correspond to step (1) as described in FIG. 14.

Step (2) is delayed by three clock cycles compared to step (1). In step (2), the first kernel (i.e., a0, b0, c0, d0, e0, f0, g0, h0, i0) of the kernel data 1300 having a size of 3×3×m as illustrated in FIG. 14 slides at stride of 1 and is calculated with the overlapping second feature map portion (i.e., F0, G0, H0, K0, L0, M0, P0, Q0, R0) among elements of the input feature map data 1310.

At this time, step (2) is sequentially processed for nine clock cycles in PE_10 of FIG. 15. That is, for the convolution operation of the first kernel delayed by three clock cycles compared to step (1) and the second feature map portion, PE_10 requires nine clock cycles for the operation.

At this time, in step (2), the signal W_in_0 ($Z^{-3}$) delayed by three clock cycles of PE_10, which is the signal of the first kernel as illustrated in FIG. 16, and the signal F_in_00 (F0, G0, H0, K0, L0, M0, P0, Q0, R0), which is the signal for the second feature map portion, are input to PE_10 of FIG. 15 for nine clock cycles. That is, each element of the first kernel (a0, b0, c0, d0, e0, f0, g0, h0, i0) delayed by three clock cycles and each element of the second feature map portion (F0, G0, H0, K0, L0, M0, P0, Q0, R0) are sequentially input to PE_10.

As in step (2) of FIG. 14, since the operation is performed by sliding the kernel data 1300 on the feature map data 1310 by a stride of 1, the elements (a0, b0, c0, d0, e0, f0, g0, h0, i0) of the kernel data 1300 may be reused after three clock cycles.

In order to reuse the kernel data 1300 to perform an operation, the kernel data 1300 output from the weight storage unit 210 is transferred to the delay buffer $Z^{-k}$ corresponding to PE_00. The kernel data 1300 transferred to the delay buffer $Z^{-k}$ is delayed by three clock cycles, and the delayed kernel data is transferred to the PE_10 of the next row through the first multiplexer MUX1 corresponding to PE_00.

As illustrated in FIG. 16, a MAC operation of step (2) is performed on the elements (F0, G0, H0, K0, L0, M0, P0, Q0, R0) of the feature map data 1310 input to the PE_10 with the kernel data delayed by three clock cycles. This operation may correspond to step (2) as described in FIG. 14.

Step (3) is delayed by three clock cycles compared to step (2). In step (3), the first kernel (i.e., a0, b0, c0, d0, e0, f0, g0, h0, i0) of the kernel data 1300 having a size of 3×3×m as illustrated in FIG. 14 slides at stride of 1 and is calculated with the overlapping third feature map portion (i.e., K0, L0, M0, P0, Q0, R0, U0, V0, W0) among elements of the input feature map data 1310.

At this time, step (3) is sequentially processed for niner clock cycles in PE_20 of FIG. 15. That is, for the convolution operation of the first kernel delayed by three clock cycles compared to step (2) and the third feature map portion, PE_20 requires nine clock cycles for the operation.

At this time, in step (3), the signal W_in_0 ($Z^{-6}$) delayed by six clock cycles of PE_20, which is the signal of the first kernel as illustrated in FIG. 16, and the signal F_in_00 (K0, L0, M0, P0, Q0, R0, U0, V0, W0), which is the signal for the third feature map portion, are input to PE_20 of FIG. 15 for nine clock cycles. That is, each element of the first kernel (a0, b0, c0, d0, e0, f0, g0, h0, i0) delayed by six clock cycles and each element of the third feature map portion (K0, L0, M0, P0, Q0, R0, U0, V0, W0) are sequentially input to PE_20.

As in step (3) of FIG. 14, since the operation is performed by sliding the kernel data 1300 on the feature map data 1310 by a stride of 1, all of the elements (a0, b0, c0, d0, e0, f0, g0, h0, i0) of the kernel data 1300 can be reused again.

Kernel data 1300 output from the weight storage unit 210 is transferred to the delay buffer $Z^{-k}$ provided in response to PE_10 to perform an operation by reusing the kernel data 1300. The kernel data 1300 transferred to the delay buffer $Z^{-k}$ is further delayed by three clock cycles, and the delayed kernel data is transferred to PE_20 through the first multiplexer MUX1 corresponding to PE_10.

As illustrated in FIG. 16, a MAC operation of step (3) is performed on the elements (K0, L0, M0, P0, Q0, R0, U0, V0, W0) of the feature map data 1310 input to the PE_20 with the kernel data delayed by six clock cycles. This operation may correspond to step (3) as described in FIG. 14.

In summary, after nine clock cycles of step (1), the convolution of PE_00 is completed. Accordingly, the accumulated value of PE_00 may be stored in the internal memory 200 or the feature map storage unit 220. After nine clock cycles of step (2), the convolution of PE_10 is completed. Accordingly, the accumulated value of PE_10 may be stored in the internal memory 200 or the feature map storage unit 220. After nine clock cycles of step (3), the convolution of PE_20 is completed. Accordingly, the accumulated value of PE_20 may be stored in the internal memory 200 or the feature map storage unit 220.

Referring back to FIG. 6, the accumulated value of each PE may be stored in the register 120. In addition, each PE may communicate with the feature map storage unit 220 through the F_out signal line. The accumulated value stored inside each PE can be initialized by receiving a reset signal at a specific clock cycle after the MAC operation is completed, and thus, the initialized PE may be in a ready state to perform a new MAC operation.

When each step is completed and the completed result is stored in the internal memory 200 or the feature map storage unit 220, the value stored in each processing element may be initialized by the reset signal shown in FIG. 6. Thus, PE_00 completed step (1) is ready to process step (4). Thus, PE_10 completed step (2) is ready to process step (5). Therefore, PE_20 completed step (3) is ready to process step (6).

Thereafter, as described above in the steps (4), (5), (6), and so on of FIG. 14, an operation by reuse of weight data may be performed.

For steps (4), (5), (6), the signal line F_in_00 may sequentially supply new elements (B0, C0, D0, G0, H0, I0, L0, M0, N0, Q0, R0, S0, V0, W0, X0) of the feature map data 1310 to the first PE column (PE_00, PE_10, PE_20). However, the present disclosure is not limited thereto, and it is also possible that steps (4), (5), (6) can be processed in another PE column. Also, steps (1), (2), (3) and steps (4), (5), (6) may be processed sequentially in one PE column or in parallel in different PE columns.

That is, when steps (1) to (3) are completed, steps (4) to (6) can be repeated in the same manner. Accordingly, the first PE column (PE_00, PE_10, PE_20) may sequentially receive various kernels and various feature maps to process a plurality of depth-wise convolution operations.

In this case, at least a portion of the kernel data 1300 may be reused through the delay buffer $Z^{-k}$ in the PE array 100.

In other words, if the delay buffer is not provided in the processing element array and the kernel data is unnecessarily loaded from the weight storage unit 210 into the processing element array for each MAC operation, reuse of the kernel data becomes impossible.

However, the PE array 100 according to examples of the present disclosure uses a delay buffer for reuse weight data of depth-wise convolution to reduce resources and memory usage used in calculations. Therefore, an efficient depth-wise convolution operation is possible.

As described above, the PE array 100 may perform an efficient depth-wise convolution operation using the delay buffer $Z^{-k}$ provided in the PE array 100.

As illustrated in FIG. 16, elements of the kernel data 1300 overlap for six clock cycles with respect to PE_00 and PE_10, and elements of the kernel data 1300 overlap for six clock cycles with respect to PE_10 and PE_20. Accordingly, the calculation speed may be improved by such overlapping portions.

According to examples of the present disclosure, the feature map data 1310 output from the feature map storage unit 220 may be broadcast to a plurality of PE columns through an F_in signal line having a branch.

For example, the F_in_00 signal line broadcasts the feature map data 1310 to the first PE column (PE_00, PE_10, and PE_20). The F_in_01 signal line broadcasts the feature map data to the second PE column (PE_01, PE_11, PE_21). The F_in_0M signal line broadcasts the feature map data to the Mth PE columns (PE_0M, PE_1M, PE_2M). Therefore, the NPU 1000 according to examples of the present disclosure may be configured to perform a depth-wise convolution operation capable of reusing kernel data for each PE column, respectively.

Hereinafter, an operation of the processing element array performing the depth-wise convolution operation when the value of the stride is "2" will be described in detail with reference to FIGS. 13, 15, 17 and 18.

Figure 17:
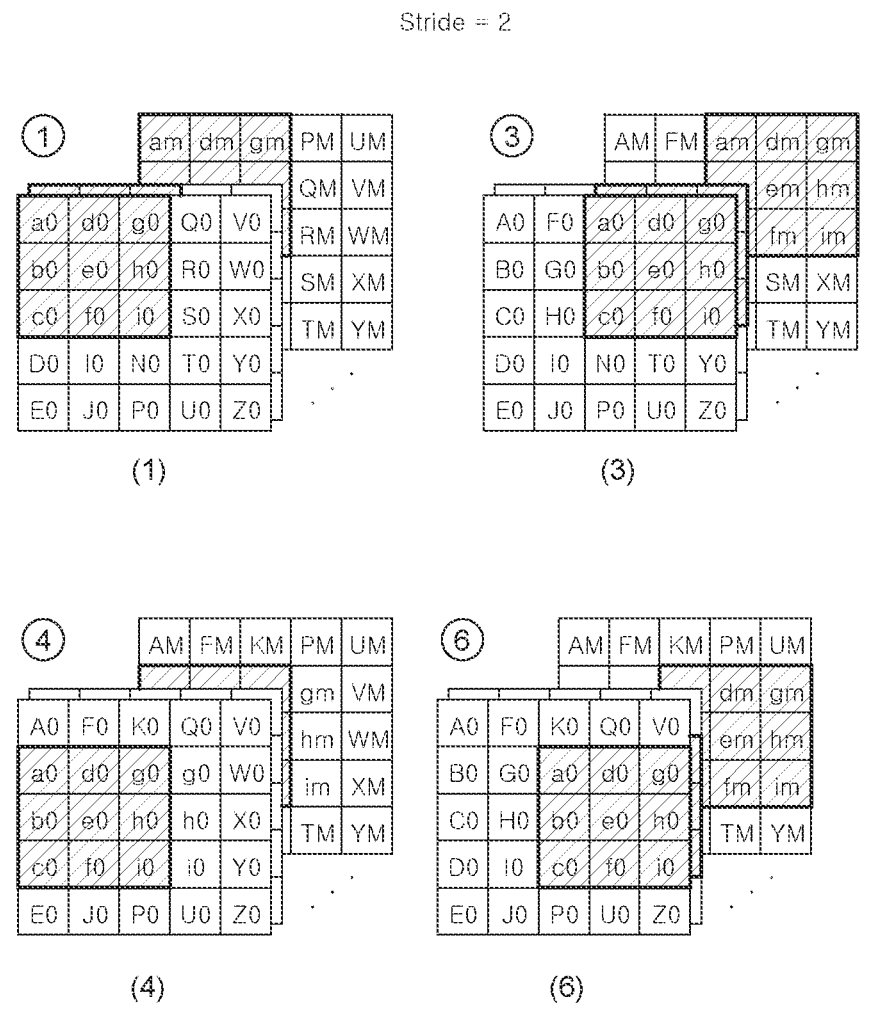
Figure 18:
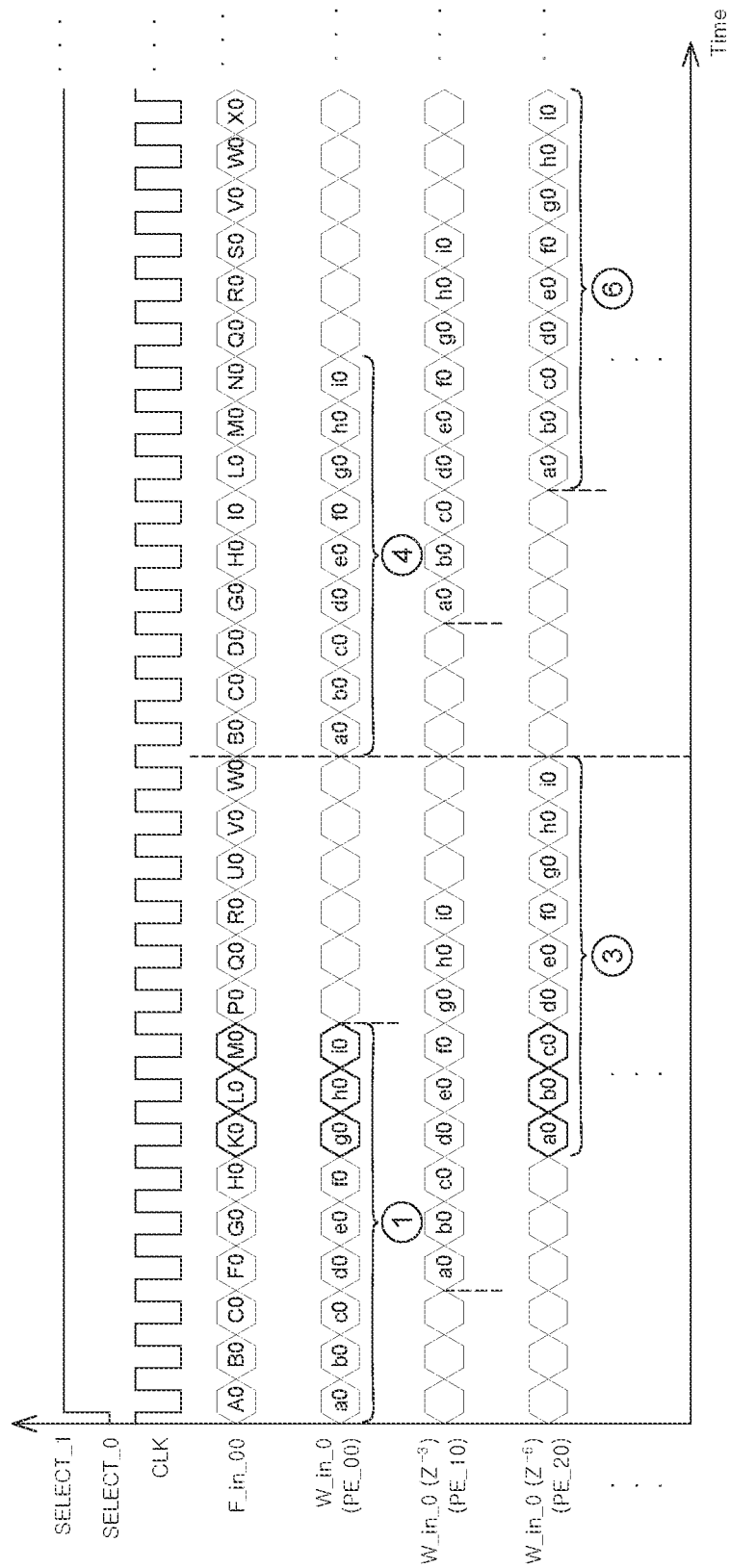
FIG. 18 is an exemplary diagram for explaining weight data stored over time in a delay buffer according to an example of the present disclosure.

FIG. 17 is for explaining a depth-wise convolution operation on weight data and feature map data according to an example of the present disclosure. FIG. 18 is for explaining weight data stored over time in a delay buffer according to an example of the present disclosure. For the convenience of the description, redundant descriptions may be omitted.

First, referring to FIG. 13, it is assumed that a depth-wise convolution operation is performed on the kernel data 1300 in the form of a 3×3×m matrix and the input feature map data 1310 in the form of a 5×5×M matrix. It is assumed that the stride between the kernel data 1300 and the input feature map data 1310 for the convolution operation is "2." That is, the stride may be changed from "1" to "2."

In this case, the convolution operation is performed by sliding the kernel data 1300 of size 3×3×m over the input feature map data 1310 of size 5×5×M by 2 stride, such that each value of the kernel data 1300 is multiplied by each value of the input feature map data 1310 that overlaps, and all of the multiplied values are added.

Comparing FIGS. 14 and 17, as the stride is changed from 1 to 2, steps (2) and (5) may be omitted. Therefore, each step will be described in detail with reference to FIGS. 17 and 18.

Step (1) of FIGS. 17 and 18 is substantially the same as step (1) of FIGS. 14 and 16. Therefore, redundant description may be omitted. the first kernel (i.e., a0, b0, c0, d0, e0, f0, g0, h0, i0) of the kernel data 1300 having a size of 3×3×m as illustrated in FIG. 14 slides at a stride of 2 and is calculated with the overlapping first feature map portion (i.e., A0, B0, C0, F0, G0, H0, K0, L0, M0) among elements of the input feature map data 1310.

At this time, step (1) is sequentially processed for nine clock cycles in PE_00 of FIG. 18. That is, for the convolution operation of the first kernel and the first feature map portion, PE_00 requires nine clock cycles for the operation.

Step (2) of the example of FIGS. 14 and 16 is not substantially performed in the example of FIGS. 17 and 18. However, the NPU 1000 according to the embodiment of FIGS. 17 and 18 may operate substantially the same as step (2) of FIGS. 14 and 16.

However, in the example of FIGS. 17 and 18, in the case of a stride of 2, since step (2) is unnecessary, the controller 300 of the NPU 1000 may inactivate the F_out signal line outputting the MAC operation value of the exemplary PE_10 performing step (2). That is, various stride values can be easily adjusted by not taking the MAC operation value of a specific processing element. According to the above configuration, there is an effect that the stride value can be easily applied by selectively controlling only the output of the F_out signal line of PEs.

Step (3) of FIGS. 17 and 18 is substantially the same as step (3) of FIGS. 14 and 16. Therefore, redundant description may be omitted. Step (3) is delayed by six clock cycles compared to step (1). In step (3), the first kernel (i.e., a0, b0, c0, d0, e0, f0, g0, h0, i0) of the kernel data 1300 having a size of 3×3×m as illustrated in FIG. 17 slides at a stride of 2 and is calculated with the overlapping third feature map portion (i.e., K0, L0, M0, P0, Q0, R0, U0, V0, W0) among elements of the input feature map data 1310.

At this time, step (3) is sequentially processed for nine clock cycles in PE_20 of FIG. 15. That is, for the convolution operation of the first kernel delayed by six clock cycles compared to step (1) and the third feature map portion, PE_20 requires nine clock cycles for the operation.

That is, for nine clock cycles of step (1), the convolution of PE_00 is completed. Accordingly, the accumulated value of PE_00 may be stored in the internal memory 200 or the feature map storage unit 220.

As described above, the convolution of PE_10 is completed for nine clock cycles of step (2). However, the accumulated value of PE_10 may not be output.

For nine clock cycles of step (3), the convolution of PE_20 is completed. Accordingly, the accumulated value of PE_20 may be stored in the internal memory 200 or the feature map storage unit 220.

If each step is completed, and the completed result may be selectively stored in the internal memory 200 or the feature map storage unit 220. Thus, PE_00, having completed step (1), is ready to process step (4). Therefore, PE_20, having completed step (3), is ready to process step (6).

Thereafter, the steps (4), (6) and the like of FIG. 14 can also be performed by reuse of weight data as described above.

For steps (4) and (6), the signal line F_in_00 may sequentially supply new elements (B0, C0, D0, G0, H0, I0, L0, M0, N0, Q0, R0, S0, V0, W0, X0) of the feature map data 1310 to the first PE column (PE_00, PE_10, PE_20).

That is, when steps (1) and (3) are completed, steps (4) and (6) can be repeated in the same manner.

In this case, at least a portion of the kernel data 1300 may be reused through the delay buffer $Z^{-k}$ in the PE array 100.

As illustrated in FIG. 18, elements of the kernel data 1300 overlap for three clock cycles with respect to PE_00 and PE_20. Accordingly, the calculation speed may be improved by such overlapping portions.

Hereinafter, an unnecessary operation of the PE array will be described with reference to FIGS. 13, 15, 17 and 19 when the calculation of PEs in a specific column at a specific kernel size and at a specific stride during the depth-wise convolution operation.

Figure 19:
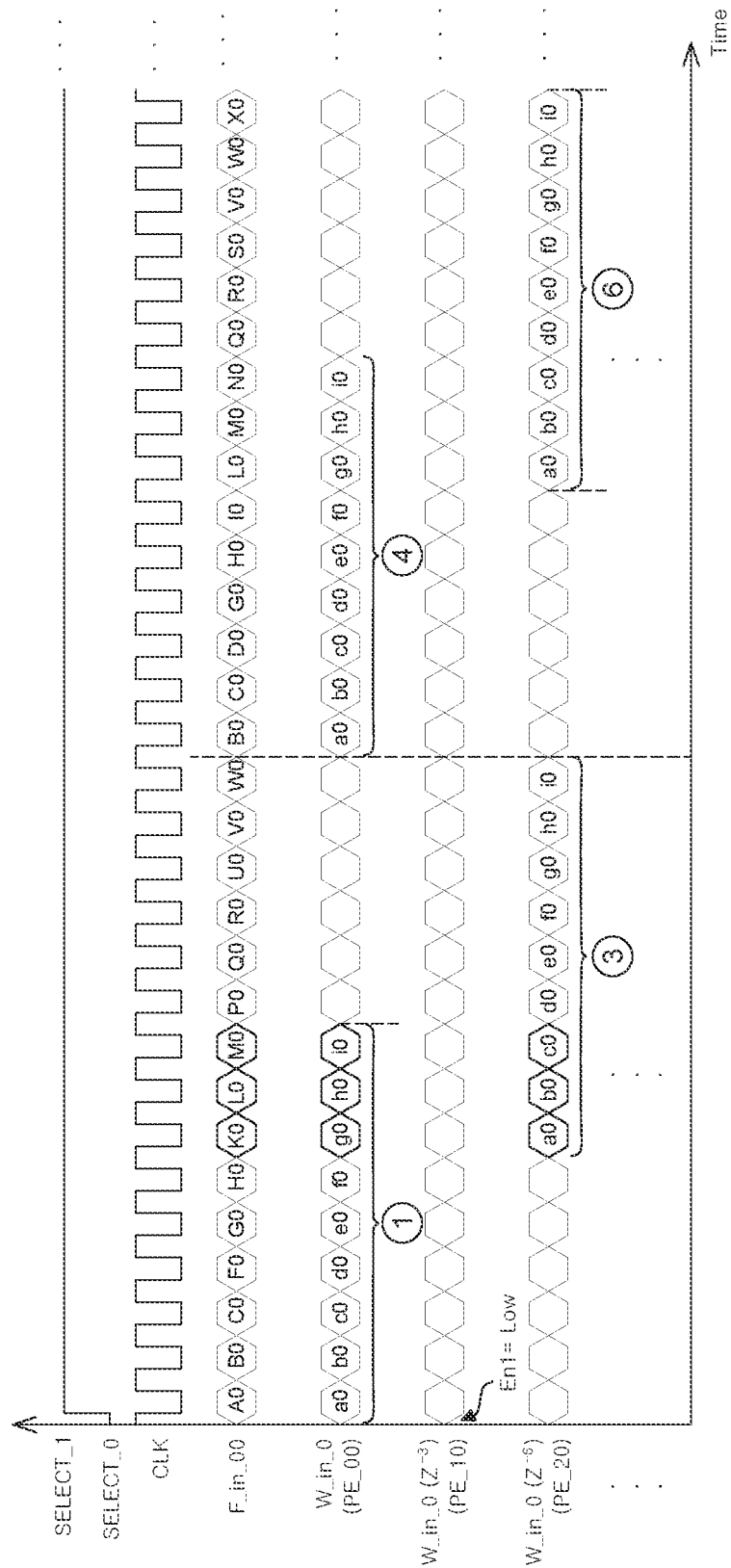
FIG. 19 is an exemplary diagram for explaining weight data stored over time in a delay buffer according to an example of the present disclosure.

FIG. 19 is for explaining weight data stored over time in a delay buffer according to an example of the present disclosure.

First, as described with reference to FIGS. 13 and 17, it is assumed that the specific kernel size is 3×3×m and the specific stride is 2.

For depth-wise convolution operation, the weight data output from the weight storage unit 210 (i.e., the kernel data 1300) is input to PEs (PE_00, PE_01, . . . ) corresponding to the first column of each of the plurality of PE rows, and corresponding weight data is input to the delay buffer $Z^{-k}$ to be delayed by a preset number of clock cycles. However, when the depth-wise convolution operation is performed with the aforementioned kernel size of 3×3×m and stride of 2, such that the kernel data 1300 slides by a stride of 2 on the feature map data 1310, then the weight data, delayed by k clock cycles through the delay buffer $Z^{-k}$, may be bypassed to the delay buffer $Z^{-k}$ disposed corresponding to the second PE row (PE_10, PE_11, . . . ), delayed by 2k clock cycles, and then inputted to the third PE row (PE_20, PE_21, . . . ), which is the next row.

In this case, as illustrated in FIGS. 15 and 19, since the second PE row (PE_10, PE_11, . . . ) does not perform any arithmetic operation, the second PE row (PE_10, PE_11, . . . ) may be inactivated by transmitting an En signal (e.g., En1=Low) for inactivation.

As such, when the second PE row is inactivated, the MAC operation may be performed only on each of the first PE row and the third PE row. As such, the present disclosure can reduce power consumption of the NPU by deactivating unnecessary PEs that do not perform a MAC operation.

The examples illustrated in the specification and the drawings are merely provided to facilitate the description of the subject matter of the present disclosure and to provide specific examples to aid the understanding of the present disclosure and it is not intended to limit the scope of the present disclosure. It is apparent to those of ordinary skill in the art to which the present disclosure pertains in which other modifications based on the technical spirit of the present disclosure can be implemented in addition to the examples disclosed herein.

[National R&D Project Supporting This Invention]
[Task Identification Number] 1711117015
[Task Number] 2020-0-01297-001
[Name of Ministry] Ministry of Science and ICT
[Name of Project Management (Specialized) Institution] Institute of Information & Communications Technology Planning & Evaluation
[Research Project Title] Next-generation Intelligent Semiconductor Technology Development (Design) (R&D)
[Research Task Title] Technology Development of a Deep Learning Processor Advanced to Reuse Data for Ultra-low Power Edge
[Contribution Rate] 1/1
[Name of Organization Performing the Task] DeepX Co., Ltd.
[Research period] 2020.04.01~2024.12.31

What is claimed is:

1. A neural processing unit (NPU) comprising:
   a mode selector configured to select a first mode or a second mode; and
   a processing element (PE) array operating in one of the first mode and the second mode and including a plurality of processing elements arranged in PE rows and PE columns, the PE array configured to receive an input of first input data and an input of second input data, respectively,
   wherein, in the second mode, the first input data is inputted in a PE column direction of the PE array and is transmitted along the PE column direction while being delayed by a specific number of clock cycles, and the second input data is broadcast to the plurality of processing elements of the PE array to which the first input data is delayed by the specific number of clock cycles, and
   wherein the specific number of clock cycles is determined based on a size of a weight kernel of an artificial neural network model or a stride value of a convolution.

2. The NPU of claim 1, wherein the PE array is further configured to perform a point-wise convolution operation in the first mode.

3. The NPU of claim 1, wherein the PE array is further configured to perform a depth-wise convolution operation in the second mode.

4. The NPU of claim 1, wherein, in the first mode, the plurality of processing elements of each PE column of the PE array is pipelined to transfer the first input data.

5. The NPU of claim 1, wherein, in the first mode, the second input data is unicast to each of the plurality of processing elements of each PE row of the PE array.

6. The NPU of claim 1, wherein the PE array further includes a delay buffer configured to output the first input data by delaying the first input data by the specific number of clock cycles.

7. The NPU of claim 1, wherein the PE array is further configured to determine the specific number of clock cycles based on a size of a weight kernel of an artificial neural network model.

8. The NPU of claim 1, wherein, in the second mode, the second input data is broadcast to a PE column of the PE array through a signal line having a branch through which the first input data delayed by the specific number of clock cycles is applied to the signal line of the PE column.

9. The NPU of claim 1, wherein, in the second mode, the PE rows of the PE array consist of a first group of PE rows configured to be activated based on a size of a weight kernel of the artificial neural network model and a second group of PE rows that excludes the PE rows of the first group and is configured to be deactivated.

10. The NPU of claim 1, wherein the PE array further includes:
a first multiplexer disposed in at least some of the PE rows;
a second multiplexer disposed at an input portion of the at least some of the PE rows; and
a delay buffer disposed in the at least some of the PE rows.

11. A neural processing unit (NPU) comprising:
a mode selector configured to select a first mode or a second mode; and
a processing element (PE) array including a plurality of processing elements arranged in PE rows and PE columns, the PE array configured to perform a first convolution operation in the first mode and perform a second convolution operation in the second mode,
wherein the PE array is further configured to reuse weight data for the second convolution operation within the PE array,
wherein the PE array includes a delay buffer configured to delay the weight data by a predetermined number of clock cycles, and
wherein the delay buffer is configured to delay the weight data based on a size of a weight kernel.

12. The NPU of claim 11, wherein the first convolution operation includes a standard or point-wise convolution operation.

13. The NPU of claim 11, wherein the second convolution operation includes a depth-wise convolution operation.

14. The NPU of claim 11, wherein the delay buffer is configured for reuse of the weight data of a depth-wise convolution operation.

15. The NPU of claim 11, wherein, in the first mode, the PE array is further configured to receive
an input of the weight data that is used for the first convolution operation and is inputted to a pipelined processing element of each PE column of the PE array, and
an input of feature map data that is used for the first convolution operation and is unicast to each PE of the PE rows of the PE array.

16. The NPU of claim 11, wherein the delay buffer is disposed in at least some of the PE rows of the PE array and is configured in the second mode to receive
an input of the weight data that is used for the second convolution operation, and
an input of the weight data that is delayed by the delay buffer and is outputted from the delay buffer.

17. A neural processing unit (NPU) comprising:
a weight storage configured to load weight data used for a convolution operation;
a feature map storage configured to load feature map data used for the convolution operation; and
a processing element (PE) array including a plurality of processing elements and a plurality of delay units arranged to correspond to at least some of the processing elements of the PE array, the plurality of delay units configured to
selectively delay the weight data by a switch unit corresponding to the plurality of delay units, and
receive an input of the weight data that is used for the convolution operation, and an input of the weight data that is delayed by the plurality of delay units and is outputted from the plurality of delay units.

18. A processing element array comprising:
a first processing element configured to receive weight data;
a delay unit configured to receive the weight data, delay the weight data by a specific number of clock cycles, and transmit the weight data to a second processing element; and
a broadcast signal line configured to provide feature map data simultaneously to the first processing element and the second processing element,
wherein the delay unit is configured to process depth-wise convolution by reusing the weight data, and
wherein the specific number of clock cycles is determined based on a size of a weight kernel of an artificial neural network model or a stride value of a convolution.

* * * * *